US012276637B2

(12) United States Patent
Behandish

(10) Patent No.: US 12,276,637 B2
(45) Date of Patent: Apr. 15, 2025

(54) NONDESTRUCTIVE METHODS AND SYSTEMS FOR DETECTING AND/OR CHARACTERIZING DAMAGE

(71) Applicant: Palo Alto Research Center Incorporated, Palo Alto, CA (US)

(72) Inventor: Morad Behandish, San Mateo, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 334 days.

(21) Appl. No.: 17/819,515

(22) Filed: Aug. 12, 2022

(65) Prior Publication Data
US 2024/0053303 A1     Feb. 15, 2024

(51) Int. Cl.
*G01N 29/44* (2006.01)
*G01N 29/04* (2006.01)

(52) U.S. Cl.
CPC ....... *G01N 29/4472* (2013.01); *G01N 29/041* (2013.01); *G01N 29/4481* (2013.01); *G01N 2291/02818* (2013.01)

(58) Field of Classification Search
CPC ............ G01N 29/041; G01N 29/4472; G01N 29/4481; G01N 2291/02818
USPC .......................................................... 702/39
See application file for complete search history.

(56) References Cited

U.S. PATENT DOCUMENTS 11,397,227 B2 *   7/2022  Gallippi ............... A61B 8/5223
2007/0234805 A1 * 10/2007  MacEnany ......... G01N 29/0654
                                                            73/570

FOREIGN PATENT DOCUMENTS

WO     WO-2008130344 A1 * 10/2008 ............... G01H 5/00

OTHER PUBLICATIONS

Sugita et al., JP 2021189050 A, "Nondestructive Structure Analyzer, Nondestructive Structure Inspection Device, and Nondestructive Structure Analysis Method", Date published: Dec. 13, 2021 (Year: 2021).*

* cited by examiner

*Primary Examiner* — John H Le
(74) *Attorney, Agent, or Firm* — Vorys, Sater, Seymour and Pease, LLP

(57) ABSTRACT

A nondestructive method for detecting damage in parts and/or characterizing effective material properties may include: exposing a material to one or more nondestructive stimuli; measuring a response of the material to the stimuli; selecting at least one of a specific length scale or a specific time scale; and analyzing the measurement of the response with a scale-aware single- or multi-physics model to identify anomalies in the measurements as compared to an expected response of the material to the stimuli, wherein the scale-aware single- or multi-physics model is based on the at least one of the specific length scale or the specific time scale.

16 Claims, 22 Drawing Sheets

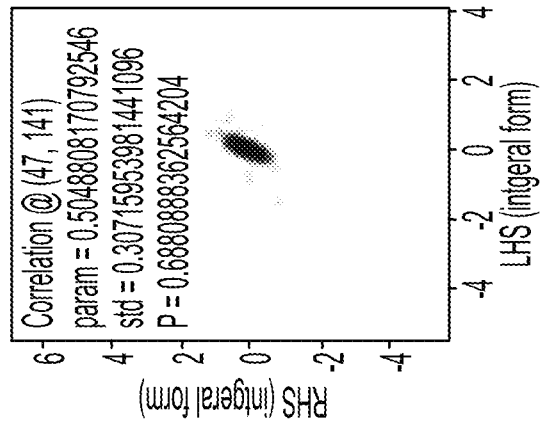
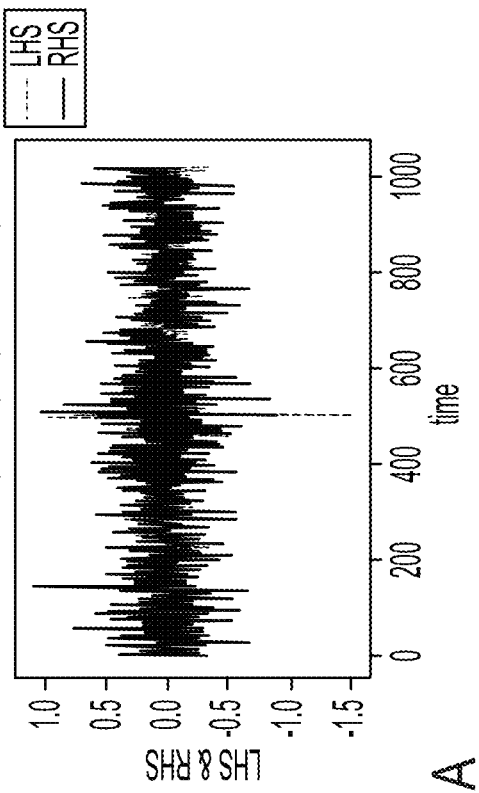
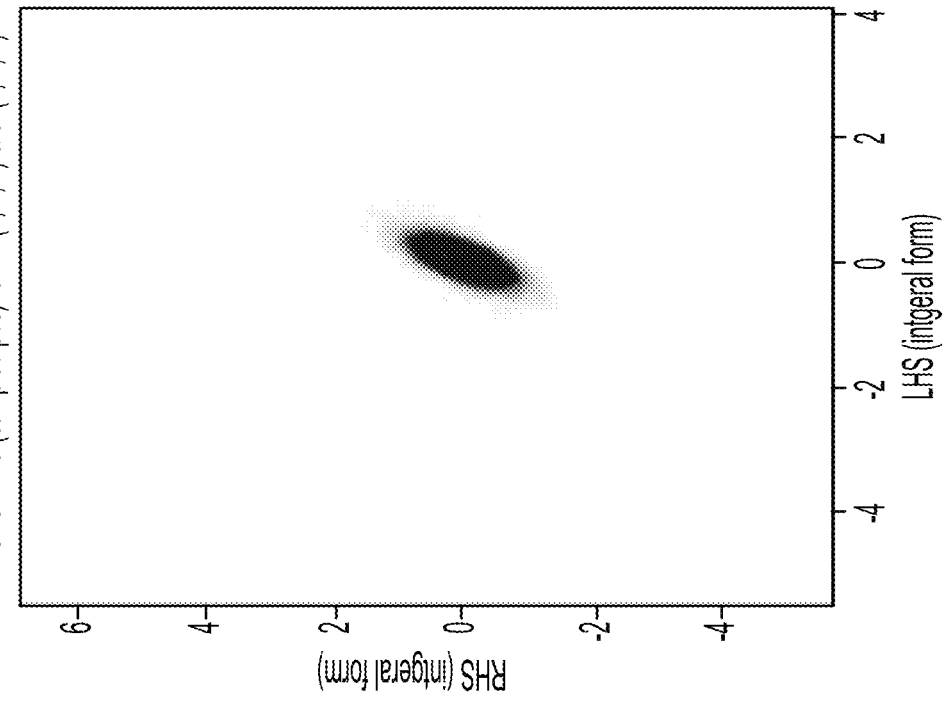
FIG. 8A

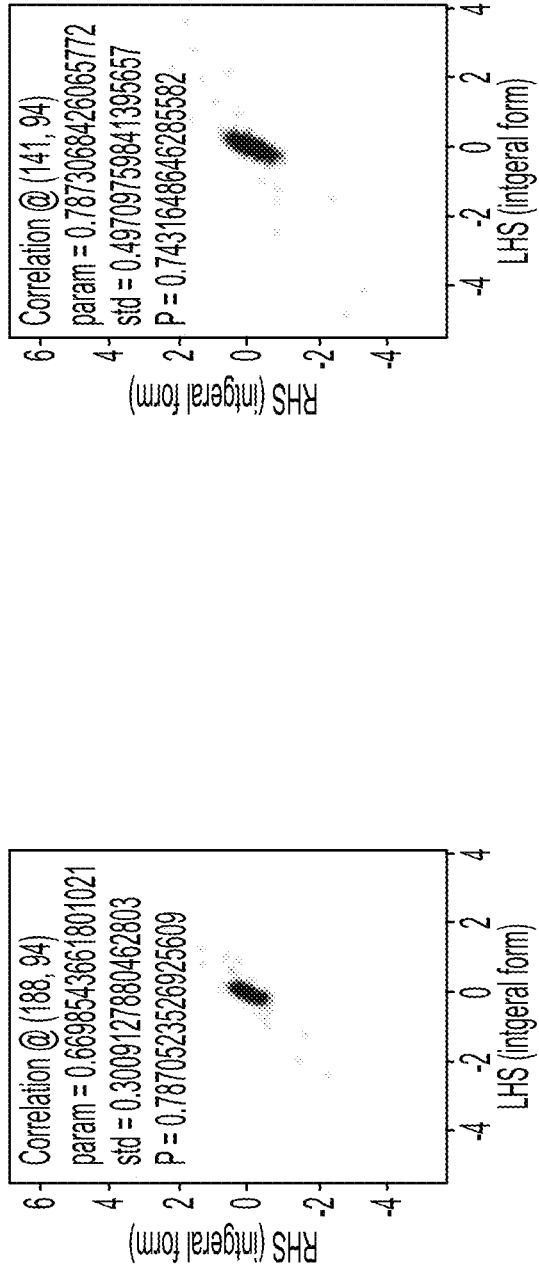
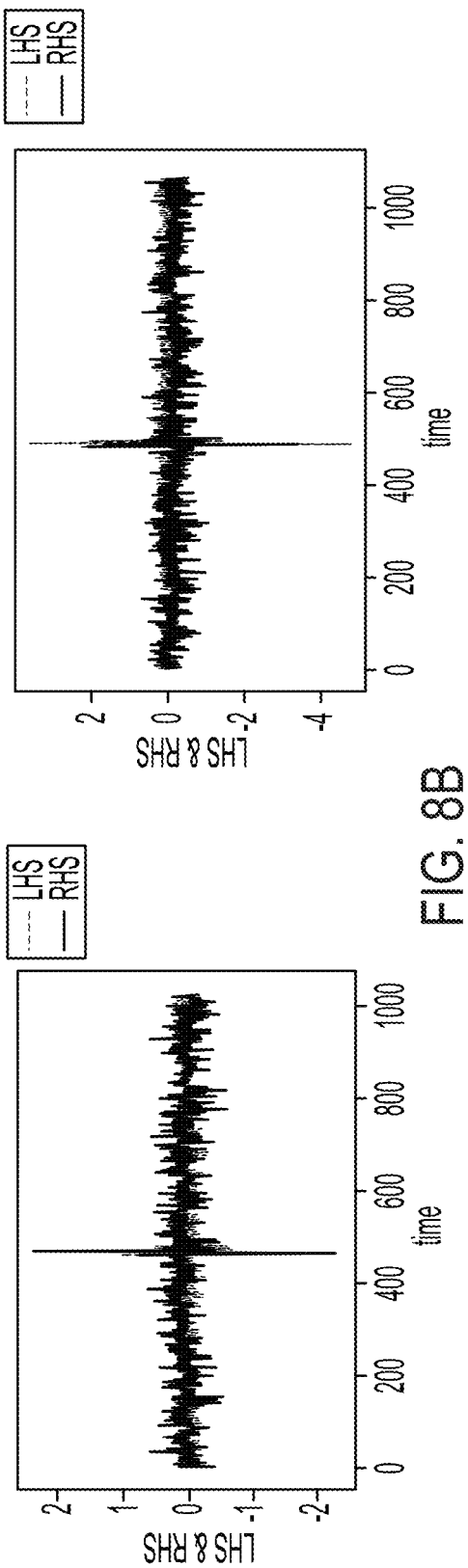
FIG. 8B

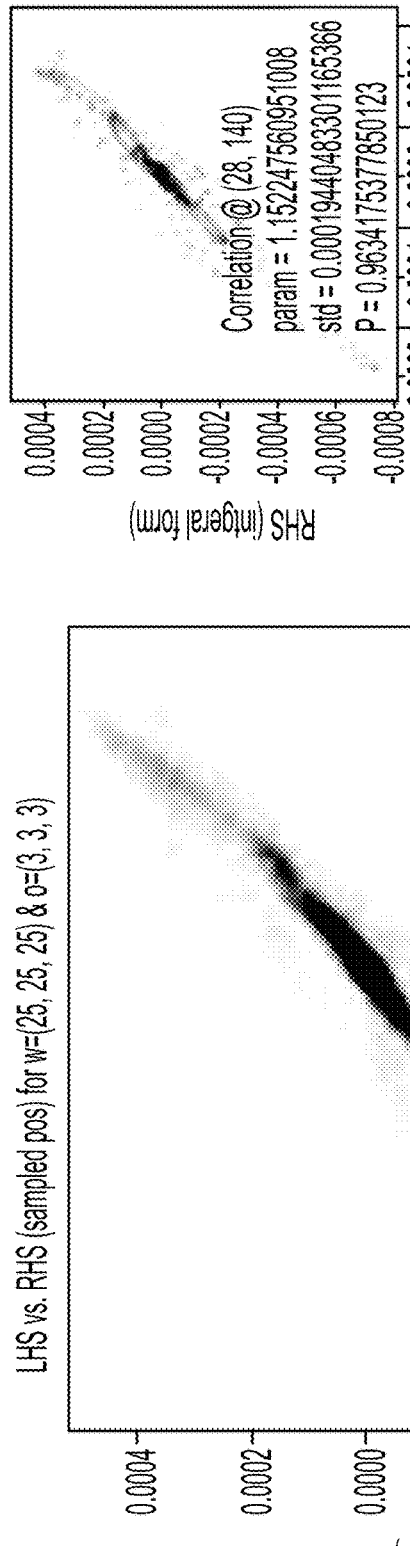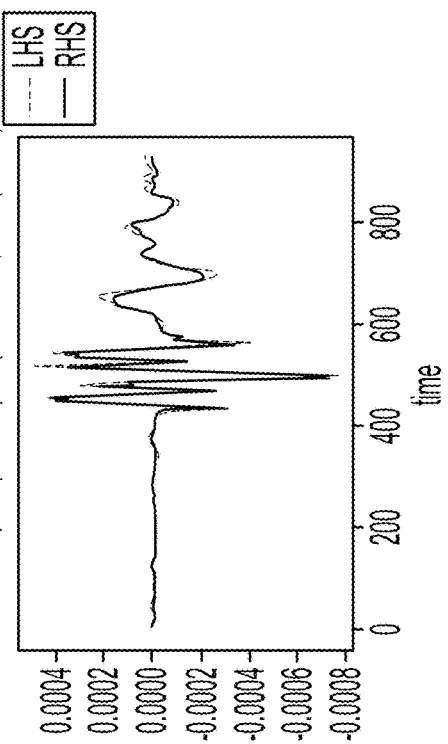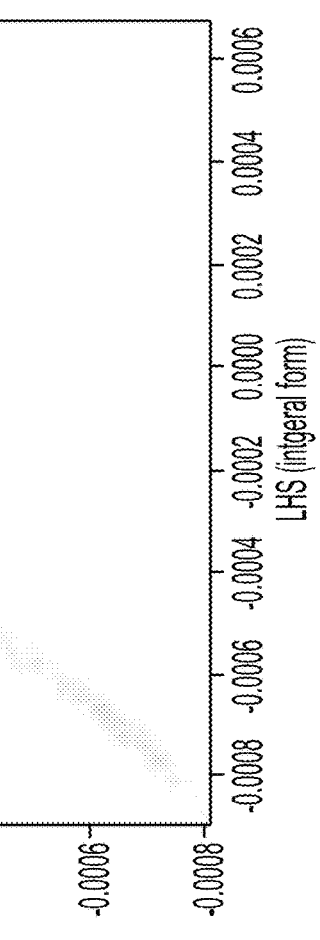
FIG. 9A

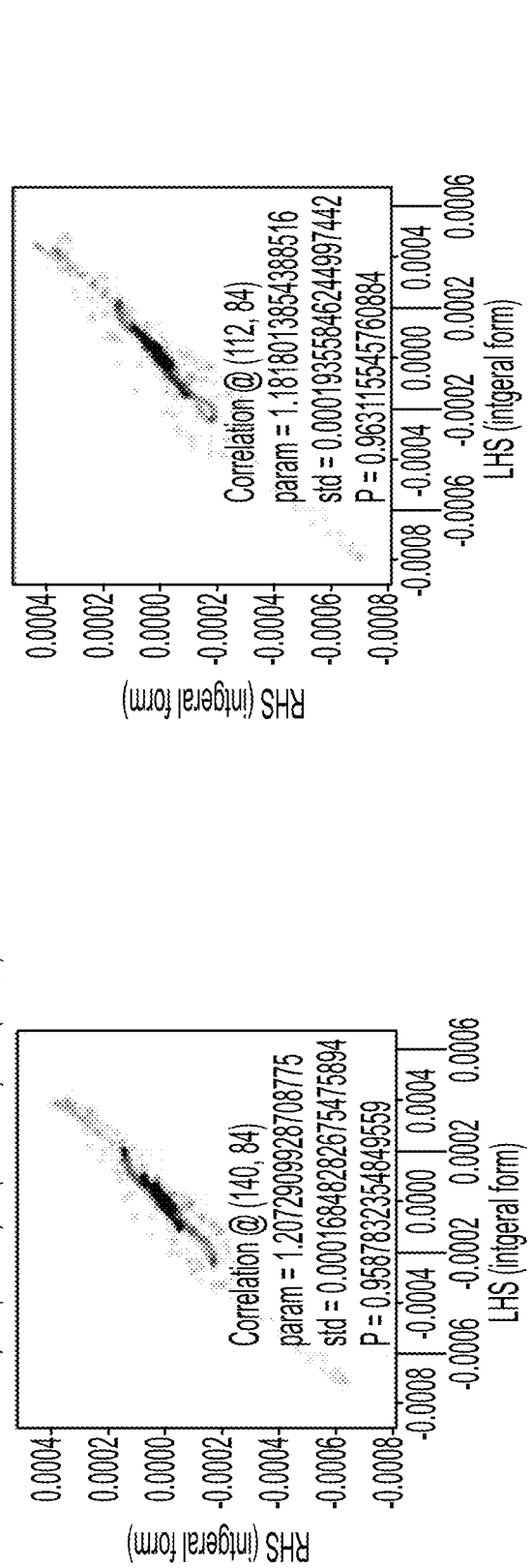
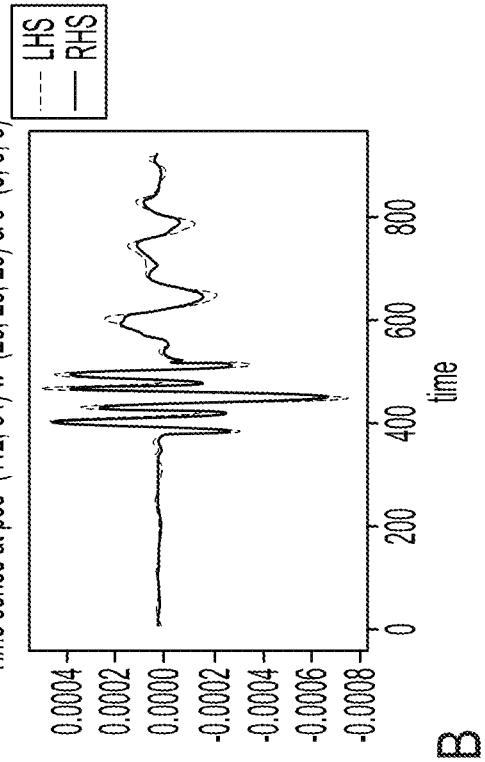
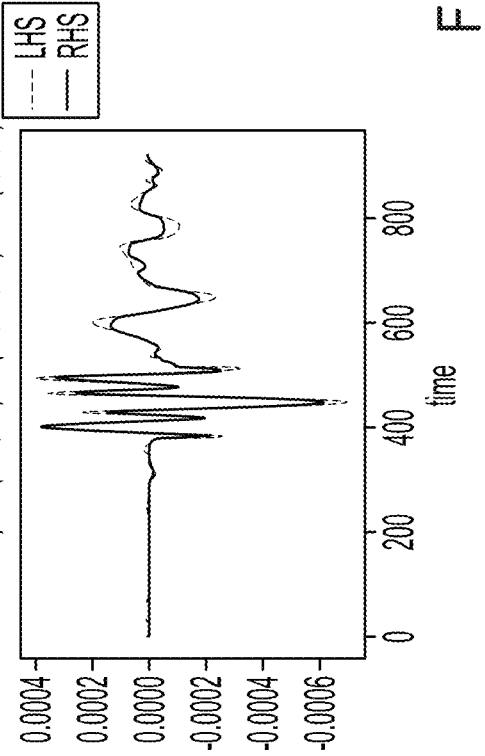
FIG. 9B

NONDESTRUCTIVE METHODS AND SYSTEMS FOR DETECTING AND/OR CHARACTERIZING DAMAGE

STATEMENT REGARDING FEDERALLY-SPONSORED RESEARCH AND DEVELOPMENT

This invention was made with Government support under contract number HR00111990029 awarded by DARPA. The Government has certain rights in this invention.

FIELD OF INVENTION

The present disclosure relates to nondestructive methods and systems for detecting damage in parts and/or characterizing effective material properties.

BACKGROUND

Non-destructive testing allows for detecting damage (e.g., cracks or voids) in materials before they grow to a critical size, causing catastrophic failure in engineering structures (e.g., aerospace systems). Similar imaging techniques can be expanded beyond damage detection to characterize effective material properties at different scales.

Nondestructive evaluation may be used, for example, when qualifying objects produced using additive manufacturing processes, assessing the condition of a component composed when servicing a larger system (e.g., a vehicle or a chemical reactor). Nondestructive methods typically involve stimulating the material with a sound wave (also known as an acoustic wave), electrical current, or magnetic field and analyzing how the material responds to the stimulus. For example, a crack in a steel drum may react to an ultrasound wave different than an intact portion of the steel drum. Further characterization of the exact type of damage to the material may use discretized differential equations or surrogate models fit to data. The surrogate models may use local discretization of differential operators and de-noising filters on the data. The mathematical characterizations of the damage rely on implicit assumptions that signal and noise can be separated (or distinguished between) the data. This is a reasonable assumption for materials with homogenous properties. However, materials like composites, reinforced materials, and metals with grain boundaries do not respond homogeneously to the stimulus. Therefore, the noise inherent in said materials having heterogeneous properties may be similar in magnitude to a signal (or response) from damage in the material.

SUMMARY OF INVENTION

The present disclosure relates to nondestructive methods and systems for detecting damage in parts and/or characterizing effective material properties. Advantageously, the methods and systems described herein may be applied to materials having heterogeneous properties.

A nonlimiting example method of the present disclosure comprises: exposing a material to one or more nondestructive stimuli; measuring a response of the material to the stimuli; selecting at least one of a specific length scale or a specific time scale; and analyzing the measurement of the response with a scale-aware single- or multi-physics model to identify anomalies in the measurements as compared to an expected response of the material to the stimuli, wherein the scale-aware single- or multi-physics model is based on the at least one of the specific length scale or the specific time scale.

Another nonlimiting example method of the present disclosure comprises: exposing a material to one or more nondestructive stimuli; measuring a response of the material to the stimuli; selecting at least one of a specific length scale or a specific time scale; and analyzing the measurement of the response with a scale-aware single- or multi-physics model to characterize one or more effective material properties based on the measurement of the response of the material to the stimuli, wherein the scale-aware single- or multi-physics model is based on the at least one of the specific length scale or the specific time scale.

A nonlimiting example system of the present disclosure comprises: a processor; a memory coupled to the processor; and instructions provided to the memory, wherein the instructions are executable by the processor to cause the system to perform methods described herein. Said system may further comprise: a nondestructive stimuli source; and a detector capable of the measuring of the response of the material to the stimuli.

BRIEF DESCRIPTION OF THE DRAWINGS

The following figures are included to illustrate certain aspects of the disclosure, and should not be viewed as exclusive configurations. The subject matter disclosed is capable of considerable modifications, alterations, combinations, and equivalents in form and function, as will occur to those skilled in the art and having the benefit of this disclosure.

FIGS. 8A-8C illustrate an attempt to fit the coefficient c at different locations on the spatial grid, with the values shown as a field on the bottom-left plot. Three locations are selected by outlined windows (not to scale), over which the computations in FIGS. 6A-6B are performed to obtain the spatial path and temporal path shown in the middle. The correlation between them is shown in the plots above each signal. The correlation for all spatial locations is shown in the larger top-left plot at once.

FIGS. 9A-9C illustrate the same as FIGS. 8A-8C except using a larger window size (as shown in the bottom-left plot, not to scale) and using the scale-aware computations in FIGS. 6C-6D. The variation in the coefficient c is better captured in the bottom-left plot, and the blue and red signals are clearly denoised and correlated. The plots of FIGS. 9A-9B resemble a line (unlike the elliptic shape in FIGS. 8A-8B) and the slope of this line is c.

DETAILED DESCRIPTION

Figure 1:
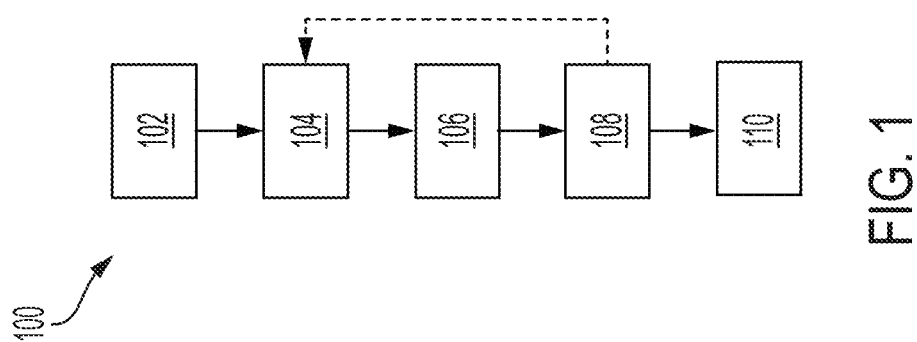
FIG. 1 is a flow diagram of a nonlimiting example method of the present disclosure.

The present disclosure relates to nondestructive methods and systems for detecting damage and/or characterizing effective material properties. Advantageously, the methods and systems described herein may be applied to materials having heterogeneous properties.

The methods and systems described herein for detecting damage and/or characterizing effective material properties may utilize a scale-aware single- or multi-physics model that captures first principles such as conservation laws exactly in a discrete setting at arbitrary length scales and time scales. The scale-aware single- or multi-physics models use a combination of differential, integral, and integro-differential equations to capture exact conservation laws and scale-aware constitutive laws, as well as physics-compatible denoising schemes to distinguish signal from noise.

The methods and systems described herein detect damage and/or characterize effective material properties (including materials having heterogeneous properties) based on the material's response to a stimulus. For example, the material may be subjected to a stimulus like an ultrasound transducer impulse, which propagates through the material at a speed that is locally dependent on the elasticity and density of the material. As the deformation waves move along the surface, the waves scatter upon moving across a grain boundary (e.g., from one grain to another in a composite metal) or hitting cavities (e.g., a crack) because of the difference in material properties between the grains or between a grain and a cavity. The surface displacement may be measured by a laser device. The scale-aware single- or multi-physics models are calibrated by systematically fitting a presumed form of differential, integral, or integro-differential equations (e.g., elastodynamics governing equations) with effective material properties at prescribed length scales and/or prescribed time scales to the spatiotemporal displacement data. Differences between the modeled base material and the measured at-scale material properties may then be used to detect damage and/or characterize effective material properties.

The ability to nondestructively detect damage and/or characterize effective material properties, especially a material having heterogeneous properties, improves material testing technologies and may be applied in a variety of sectors, including, for example, transportation, aerospace, oil and gas exploration and production, and chemical processing and synthesis, where detection, especially early detection, and/or characterization of material damage may improve worker safety and environmental impact.

Further, the scale-aware single- or multi-physics model used in conjunction with systems and methods for detecting damage and/or characterizing effective material properties are coarse-grained models based on combinations of differential, integral, or integro-differential equations that are significantly faster computational fluid/solid dynamics simulations based on discretized differential equations at the finest level of granularity. The coarse-graining, despite homogenizing material properties that parameterize phenomenological/constitutive laws, do not affect the exactness of conservation principles enforced discretely. Further, the level of granularity in the scale-aware single- or multi-physics model may be adjusted to achieve a desired computational time, relative to the computational power available, and allow for performing analyzation of the material in a reasonable amount of time (e.g., seconds to minutes to hours). This significantly improves material testing technologies.

The scale-aware single- or multi-physics models are hybrid models that distinguish between non-negotiable mathematical truism (e.g., conservation laws or symmetries) and phenomenological relations (e.g., constitutive laws) trained using data-driven methods. There are multiple advantages to such a distinguishment. First, by being unlike existing methods of homogenization that approximate the physical constraints pertaining to both fundamental and phenomenological laws upon upscaling.

Yet another advantage of methods and systems described herein is their robustness to noise. Unlike existing methods that use often arbitrary denoising filters (e.g., band-pass filters assuming separable signal and noise frequencies), the methods and systems described herein leverage the additivity of integral properties and subdivision invariance of conservation laws to perform a physics-compatible denoising, meaning that conservation laws are preserved at the length scales and/or time scales at which the conservation laws are enforced, assuming an underlying parameterization of the spatiotemporal fields. Integral forms of conservation laws can be computed using integral properties measured over enlarged spatial neighborhoods in space and elongated time intervals. Since these computations are not affected by discretization error, the only sources of error are due to inexact constitutive models and measurement errors. Assuming a zero-mean noise, the latter can be eliminated by enlarging the integration domains in space and time, consuming more data points whose random fluctuations are cancelled in the summation.

FIG. 1 illustrates a nonlimiting example method 100 of the present disclosure. In a first step 102, wavefield data is provided (e.g., collected using ultrasound or provided from a previous experiment). In a second step 104, an initial set of hyper-parameters such as window size w and polynomial order o are selected. The wavefield data is then split, in a third step 106, into training data set and test data set. Common practices in machine learning may be used to split the data. In the fourth step 108, the training data set is then used to train a scale-aware single- or multi-physics model (described in more detail herein) using machine learning techniques, and the test data set is used to test the trained scale-aware single- or multi-physics model. If the train/test errors are not acceptable (or in the special linear case, the correlation is weak) and the noise is perceived to be a problem, go back to the second step 104 and change the parameters and try again. Steps 104-108 are then repeated until a satisfactory fit is obtained. Then, the coefficient distribution (e.g., spatial field for speed of sound) from the satisfactory fit may be used in a fifth step 110 to diagnose cracks/damage or characterize grain statistics.

Material Testing Methods and Systems

Figure 2:
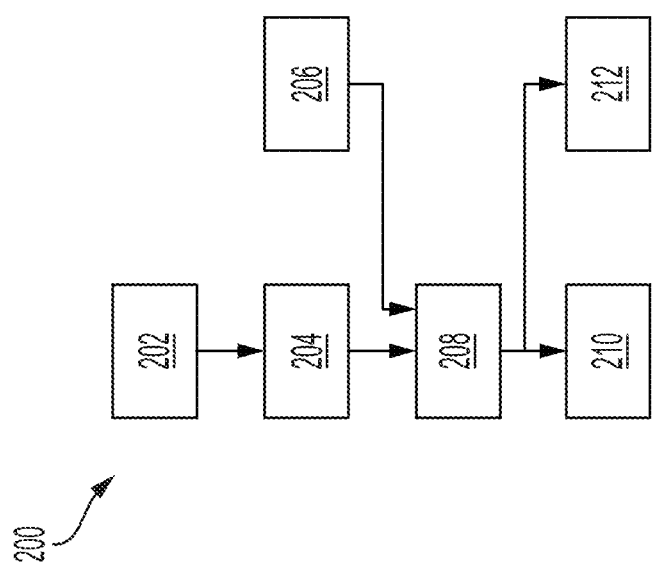
FIG. 2 is a flow diagram of a nonlimiting example method of the present disclosure.

FIG. 2 illustrates a nonlimiting example method 200 of the present disclosure, which may include: exposing 202 a material to one or more nondestructive stimuli; measuring 204 a response of the material to the stimuli; selecting 206 at least one of a specific length scale or a specific time scale; and analyzing 208 the measurement of the response with a scale-aware single- or multi-physics model (described in more detail herein) to (a) identify 210 anomalies in the measurements as compared to an expected response of the material to the stimuli and/or (b) characterize 212 one or more effective material properties based on the measurement of the response of the material to the stimuli, wherein the scale-aware single- or multi-physics model is based on the at least one of the specific length scale or the specific time scale. As described further herein, the scale-aware single- or multi-physics model comprises data-trained governing equations that enforce conservation laws relating to the material regardless of a level of granularity of constitutive laws in the governing equations.

Examples of nondestructive stimuli may include, but are not limited to, ultrasound waves, acoustic waves, electrical currents, electromagnetic fields (e.g., MRI, radar), X-rays, and the like, and any combination thereof.

The material being tested may be a solid (e.g., made of polymers, metal alloys, and composites), a liquid, a gas, or a combination thereof. The material may be tissue where MRI is used for creating the stimuli. The material may have homogeneous properties or heterogeneous properties. The material may have isotropic properties or anisotropic properties.

The response of the material to the stimulus will depend on the physics and stimuli. For example, with mechanical stimuli, the material response is measured (e.g., by a laser) in terms of surface and volumetric displacement spatiotemporal fields describing how waves propagate through the material. The material properties (e.g., elasticity and density, which determine the speed of sound in ultrasound imaging) are thus inferable indirectly by measuring the displacement fields and fitting the said properties to the underlying governing equations (e.g., mechanical elastodynamics, in this case) expressed in integral form at desired length scales and/or desired time scales. On the other hand, electromagnetic waves require no material medium to exist, although the induced electrical and magnetic fields will be altered depending on the material (e.g., water content in tissues, which determines the magnetic resonance in MRI) based on which material properties can be inferred, by fitting them to satisfy governing equations (e.g., Maxwell's laws, in this case) expressed in integral form at desired length scales and/or desired time scales.

The measurements of the response of the material to the stimulus may be input into a scale-aware single- or multi-physics model. The scale-aware single- or multi-physics model may analyze the measurements to identify anomalies in the measurements as compared to an expected response of the material to the nondestructive stimulus, or more generally, to characterize material composition (e.g., statistics of grain geometry). The anomalies may correspond to defects (e.g., cracks, pores, delamination, and the like) or deviations in the microstructural morphology. The magnitude of the anomalies may relate to the geometric properties of the defects, which, in turn, affect the at-scale constitutive behavior of the material in the scale-aware single- or multi-physics models.

The methods described herein for testing materials using a scale-aware single- or multi-physics model to detect and/or characterize a defect in the material are, at least in part, performed using computing devices or processor-based devices that include a processor; a memory coupled to the processor; and instructions provided to the memory, wherein the instructions are executable by the processor to perform the methods described herein (such computing or processor-based devices may be referred to generally by the shorthand "computer").

For example, a system may comprise: a processor; a memory coupled to the processor; and instructions provided to the memory, wherein the instructions are executable by the processor to cause the system to perform a method comprising: exposing a material to one or more nondestructive stimuli; measuring a response of the material to the stimuli; selecting at least one of a specific length scale or a specific time scale; and analyzing the measurement of the response with a scale-aware single- or multi-physics model to (a) identify anomalies in the measurements as compared to an expected response of the material to the stimuli and/or (b) characterize one or more effective material properties based on the measurement of the response of the material to the stimuli, wherein the scale-aware single- or multi-physics model is based on the at least one of the specific length scale or the specific time scale. Said system may further comprise: a nondestructive stimuli source; and a detector capable of the measuring of the response of the material to the stimuli.

Examples of nondestructive stimuli sources may include, but are not limited to, ultrasound sources, acoustic sources (e.g., impact generators, speakers, acoustic monopoles, acoustic multipoles), electrical current sources, electromagnetic field sources (e.g., MRI, radar), X-ray sources, and the like, and any combination thereof.

Examples of detectors capable of the measuring of the response of the material to the stimuli may include, but are not limited to, lasers, ultrasound detectors, microphones, voltmeters, MRI detectors, radar detectors, X-ray detectors, Geiger counters, semiconductor detectors for ionizing radiation, and the like, and any combination thereof.

Further, any calculation, determination, or analysis recited as part of methods described herein may be carried out in whole or in part using a computer.

Furthermore, the instructions of such computing devices or processor-based devices can be a portion of code on a non-transitory computer readable medium. Any suitable processor-based device may be utilized for implementing all or a portion of embodiments of the present techniques, including without limitation personal computers, networks, personal computers, laptop computers, computer workstations, mobile devices, multi-processor servers or workstations with (or without) shared memory, high performance computers, and the like. Moreover, embodiments may be implemented on application-specific integrated circuits (ASICs) or very large scale integrated (VLSI) circuits.

"Computer-readable medium" or "non-transitory, computer-readable medium," as used herein, refers to any non-transitory storage and/or transmission medium that participates in providing instructions to a processor for execution. Such a medium may include, but is not limited to, non-volatile media and volatile media. Non-volatile media includes, for example, NVRAM, or magnetic or optical disks. Volatile media includes dynamic memory, such as main memory. Common forms of computer-readable media include, for example, a floppy disk, a flexible disk, a hard disk, an array of hard disks, a magnetic tape, or any other magnetic medium, magneto-optical medium, a CD-ROM, a holographic medium, any other optical medium, a RAM, a PROM, and EPROM, a FLASH-EPROM, a solid state medium like a memory card, any other memory chip or cartridge, or any other tangible medium from which a computer can read data or instructions. When the computer-readable media is configured as a database, it is to be understood that the database may be any type of database, such as relational, hierarchical, object-oriented, and/or the like. Accordingly, exemplary embodiments of the present systems and methods may be considered to include a tangible storage medium or tangible distribution medium and prior art-recognized equivalents and successor media, in which the software implementations embodying the present techniques are stored.

Generating a Scale-Aware Single- or Multi-Physics Model for Material Testing

Figure 3:
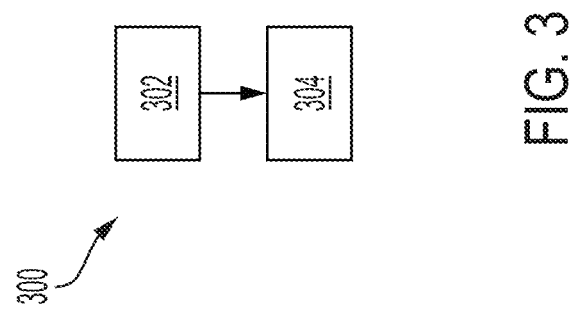
FIG. 3 is a flow diagram of a nonlimiting example method of the present disclosure.

FIG. 3 illustrates a nonlimiting example method 300 for generating a scale-aware single- or multi-physics model, which may comprise: describing 302 the response of a material (e.g., a homogeneous material or a heterogeneous material) response to stimuli (e.g., ultrasound waves) (e.g., describing the response of the material to the stimuli that was measured 204 in FIG. 2) with (1) conservation laws, which must hold in integral form regardless of the choice of the length scale and/or the time scale (e.g., the at least one of the specific length scale or the specific time scale selected 206 in FIG. 2 or selected separately and then used to define the at least one of the specific length scale or the specific time scale in the method of FIG. 2) and (2) constitutive laws that can be parameterized with unknown coefficients at given length scales and/or time scales; and determining 304 (e.g., optimizing using fits that minimize one or more errors and/or using machine learning to minimize one or more errors) the unknown coefficients of the constitutive laws with data (e.g., simulated data, experimental data, or any combination thereof) relating to the material response to the stimuli where the conservation laws are enforced regardless of the granularity at which the constitutive laws are described.

Expressing the conservation and constitutive laws in the infinitesimal limit (i.e., choosing infinitely small length scales and/or time scales) leads to ordinary or partial differential equations (ODEs/PDEs), while choosing finite length and/or time scales leads to integral or integro-differential (IEs/IDEs) with the same conservation principles satisfied exactly and in a scale-agnostic fashion, while constitutive laws are scale-aware. These equations may be accompanied by initial and/or boundary conditions (ICs/BCs). These different forms of equations, representing the scale-aware single- or multi-physics models (including infinitesimal and finite scales, in space and/or time) are hereafter referred to as symbolic equations. The SCs can be automatically generated from first principles using interaction networks (I-nets), as described in U.S. patent application Ser. No. 17/684,100, which is incorporated herein in its entirety by reference.

As used herein, the term "conservation" laws/principles refers to laws of physics, whose scale-agnostic structure can be derived directly from the mathematical (particularly, topological) properties of space and time, such as conservation of mass, conservation of mechanical or thermal energy, conservation of momentum, conservation of electrical charge, and the like. These laws are typically expressed as a balance between flows of conserved quantities through spatial or temporal boundaries, variations within the bounded regions of spacetime, and source/sink terms.

As used herein, the term "constitutive laws" refers to phenomenological relationships between two or more physical quantities that may be specific to a material or substance over a given region or space or time. These laws cannot be derived mathematically, must be measured empirically, and depend on length scales and time scales. Unlike conservation laws that include differentiation and integration due to their topological nature, constitutive laws are of algebraic nature and are typically "in-place" (i.e., do not relate regions of space and time to their boundaries).

Constitutive laws may comprise an equation or series of equations that are parameterized by coefficients that must be determined from experiments. These coefficients may change depending on the region of space and/or time over which they are defined (i.e., heterogeneity in space/time). For example, constitutive laws may describe the elasticity and/or viscosity of a material (i.e., the stress/strain or stress/strain-rate relationships, respectively) or how such relationships change with temperature, over a given 3D volume. In another example, constitutive laws may describe the relationship between heat flux and temperature gradient over a given 2D surface.

The constitutive laws may comprise a single-physics constitutive relation and/or a multi-physics coupling interaction. That is, constitutive laws may comprise a relationship (e.g., in the form of an equation or series of equations approximating the said relationship) between one or more properties of a material as a function of one or more coefficients.

For computational purposes, including fitting the coefficients of scale-aware constitutive laws, symbolic equations may involve discretizing and/or semi-discretizing the equations in space and/or time. For example, semi-discretizing a PDE in space (e.g., over a mesh) yields a system of ODEs. Discretizing the ODEs further in time yields an even larger system of algebraic equations with coefficients that can be computed by regression.

Relative to the conservation laws, examples of discretizing methods may include, but are not limited to, finite difference/volume/element schemes, mimetic schemes, spectral schemes, meshfree/meshless (e.g., point cloud) schemes, immersed boundary methods, neural field parameterizations, and the like. The discretized conservation laws may be stated in terms of exact balance equations among integral quantities such as surface fluxes and volumetric source/sink terms on cells of various dimensions in a 3D mesh, or unions of such cells in a coarse-grained mesh. The discretization resolution (i.e., size of mesh cells or period of time steps) does not produce any error in the conservation laws as the balance equations are exact for every finite region of space and/or time. Hence, one can gain significant speed-ups by using a coarse-grained mesh with fewer (but larger) cells, leading to a smaller number of equations.

In the absence of noise, integral forms of conservation laws are exact on finite regions of space and time, meaning that the integration-based discretization in space and time, as long as it is "physics-compatible" (e.g., consistent with the topological nature of the discretized quantities described in The Mathematical Structure of Classical and Relativistic Physics, by Enzo Tonti, 2013, Part of the Modeling and Simulation in Science, Engineering and Technology book series) does not produce any errors in the conservation laws (e.g., balance of momentum density with internal/external stresses and momentum density variations in time). However, the constitutive laws that, for example, relate momentum density to velocity (via inertia) or elastic or visco-elastic stresses to strains or strain rates (via elasticity and viscosity) depend on the length scale and/or time scale at which these phenomena are observed. These laws are empirical and are parameterized by material properties such as density, elasticity, and viscosity that are measured by experimenting on material specimens.

Once the symbolic equations are discretized, the unknown coefficients may be fit (e.g., determined 204 of FIG. 2) to data from high-fidelity simulations and/or experiments, using any number of regression, curve fitting, or machine learning techniques. Simulated data may be obtained, for example, by integration over the solutions of high-fidelity simulations using a much finer-grained mesh, to obtain "effective" constitutive laws over coarser-grained cells in space (and similarly in time). These effective constitutive laws can be parametrized with a linear combination of nonlinear basis functions or nonlinear neural parametrizations, to account for the geometric complexities within the larger cells, even if the original constitutive laws over the smaller cells happened to be linear.

The unknown coefficients used in the parameterization of the effective constitutive relations can be computed (e.g., determined 204 of FIG. 2) by expressing the discretized equations as feed-forward neural networks whose layers represent the integral forms of differential operators as well as in-place nonlinear functions for the effective constitutive relations. The neural network structure computes the residual error of the discretized equation over different regions of space and time, for a given set of coefficient values (i.e., neural network weights). These coefficients may be learned from data (e.g., simulated and/or experimental data) to minimize a global residual error. The implementation typically includes two sequences of tensor-based computations in parallel, one for evaluating spatial differential operators (or their integral forms) such as gradient and divergence, accompanied by integrations in time, and one for evaluating temporal differential operators (or their integral forms) such as time derivative, accompanied by integrations in space. This approach is referred to herein as effective equation fitting (EEF).

An alternative approach is to implement the temporal integration (i.e., time stepping) that solves the initial/boundary value problem for the scale-aware single- or multi-physics model akin to using a recurrent neural network. In this case, the objective is to minimize the difference between the simulation results and the given data. In other words, the solution error is used as the objective function as opposed to the equation error used in EEF. This approach is referred to herein as effective solution fitting (ESF).

For example, applying EEF to elastodynamics equations for ultrasound imaging requires two sequences of computation in parallel: (1) applying a gradient to the displacement field to obtain the strain/strain-rate fields, then applying a constitutive law to the strain/strain-rate fields to obtain the stress field (e.g., parameterized by elasticity and/or viscosity coefficients), then applying a divergence to the stress field to obtain the contribution of stress to volumetric momentum density variations, and finally applying a time integral to adjust the temporal scale consistently with the other parallel path; (2) applying a time derivative to the displacement field to obtain the velocity field, then applying a constitutive law (e.g., parametrized by inertia coefficients) to the velocity field to obtain the momentum density field, then applying another time derivative to the momentum density field to obtain the volumetric body force density field, and finally applying a space integral to adjust the spatial scale consistently with the other parallel path. The results of (1) and (2), after trimming properly around the spatial and temporal boundaries, must be in balance against external force densities. The error in this expected balance must be minimized by adjusting the constitutive coefficients. On the other hand, applying ESF to elastodynamics equations for ultrasound imaging requires an iterative sequence of computations in which the sequence in (1) is performed, in a similar fashion to the above, but the sequence in (2) is reversed, with time derivatives replaced with time integrations to compute the spatial displacement field in the next time instant from the spatial displacement field in the current time instant. The error between the expected and computed solutions must be minimized by adjusting the constitutive coefficients.

EEF is often faster than ESF because the latter needs to solve the governing equations iteratively as in inner-loop, in addition to the error minimization (i.e., training) outer-loop; while the former is a simple forward evaluation of the governing equations (i.e., no inner-loop). However, ESF is generally more reliable for highly nonlinear systems in which small equation error does not necessarily imply small solution error, which is the ultimate metric for accuracy of the coarse-graining. Moreover, in many practical problems, the state variables (e.g., displacement field in the above example) are not directly measured to be substituted in the equations for evaluating residual errors. Rather, one has to fit the coefficients to minimize the error in observables, which depend on the state variables. If this dependence cannot be inverted, EEF cannot be applied, making ESF the only viable option among the two.

If the tenor computations are implemented using machine learning frameworks (e.g., PyTorch or TensorFlow), the minimization process for both EEF and ESF can be implemented using numerous optimizers for backpropagation of errors (e.g., stochastic gradient descent (SGD), ADAM, AdaGrad, RMSprop, and the like) that are popular in machine learning, taking advantage of the automatic differentiation capabilities of machine learning frameworks (e.g., PyTorch, TensorFlow, Keras, and JAX).

The methods described herein for generating scale-aware single- or multi-physics models useful in detecting damage in or characterizing effective properties of materials are, at least in part, performed using computing devices or processor-based devices that include a processor; a memory coupled to the processor; and instructions provided to the memory, wherein the instructions are executable by the processor to perform the methods described herein.

Example Embodiments

Clause 1. A method comprising: exposing a material to one or more nondestructive stimuli; measuring a response of the material to the stimuli; selecting at least one of a specific length scale or a specific time scale; and analyzing the measurement of the response with a scale-aware single- or multi-physics model to identify anomalies in the measurements as compared to an expected response of the material to the stimuli, wherein the scale-aware single- or multi-physics model is based on the at least one of the specific length scale or the specific time scale.

Clause 2. The method of Clause 1, wherein the scale-aware single- or multi-physics model comprises governing equations composed of scale-agnostic first principles and scale-aware phenomenological laws.

Clause 3. The method of Clause 2, wherein the scale-agnostic first principles are conservation laws that must hold over any finite or infinitesimal regions in space or time, and the scale-aware phenomenological laws are single- or multi-physics constitutive or interaction laws that must be learned from data at the at least one of the specific length scale and the specific time scale.

Clause 4. The method of Clause 3, wherein the constitutive laws are discretized or integrated, and wherein the scale-aware phenomenological laws are parameterized to yield parameters, and wherein optimization is used to fit the parameters to minimize a residual error for the governing equations, a solution error, or an error in observables.

Clause 5. The method of any of Clauses 3-4, wherein the constitutive laws are discretized or integrated, and wherein the scale-aware phenomenological laws are parameterized, and wherein machine learning is used to fit the parameters to minimize a residual error for the governing equations, a solution error, or an error in observables. Clause 6. The method of any of Clauses 1-5, wherein the at least one of the specific length scale and the specific time scale are selected manually by a user.

Clause 7. The method of any of Clauses 1-6, wherein the at least one of the specific length scale and the specific time scale are selected by a computer based on a goodness of fit of the scale-aware single- or multi-physics model to the measurement of the response for different length scales and/or different time scales.

Clause 8. The method of any of Clauses 1-7, wherein the one or more nondestructive stimuli comprise one or more of: ultrasound waves, acoustic waves, electrical currents, electromagnetic fields, or X-rays.

Clause 9. A system comprising: a processor; a memory coupled to the processor; and instructions provided to the memory, wherein the instructions are executable by the processor to cause the system to perform the method of any of Clauses 1-8.

Clause 10. The system of Clause 9 further comprising: a nondestructive stimuli source; and a detector capable of the measuring of the response of the material to the stimuli.

Clause 11. A method comprising: exposing a material to one or more nondestructive stimuli; measuring a response of the material to the stimuli; selecting at least one of a specific length scale or a specific time scale; and analyzing the measurement of the response with a scale-aware single- or multi-physics model to characterize one or more effective material properties based on the measurement of the response of the material to the stimuli, wherein the scale-aware single- or multi-physics model is based on the at least one of the specific length scale or the specific time scale.

Clause 12. The method of Clause 11, wherein the scale-aware single- or multi-physics model comprises governing equations composed of scale-agnostic first principles and scale-aware phenomenological laws.

Clause 13. The method of Clause 12, wherein the scale-agnostic first principles are conservation laws that must hold over any finite or infinitesimal regions in space or time, and the scale-aware phenomenological laws are single- or multi-physics constitutive or interaction laws that must be learned from data at the at least one of the specific length scale and the specific time scale.

Clause 14. The method of Clause 13, wherein the constitutive laws are discretized or integrated, and wherein the scale-aware phenomenological laws are parameterized to yield parameters, and wherein optimization is used to fit the parameters to minimize a residual error for the governing equations, a solution error, or an error in observables.

Clause 15. The method of any of Clauses 13-14, wherein the constitutive laws are discretized or integrated, and wherein the scale-aware phenomenological laws are parameterized, and wherein machine learning is used to fit the parameters to minimize a residual error for the governing equations, a solution error, or an error in observables.

Clause 16. The method of any of Clauses 11-14, wherein the at least one of the specific length scale and the specific time scale are selected manually by a user.

Clause 17. The method of any of Clauses 11-16, wherein the at least one of the specific length scale and the specific time scale are selected by a computer based on a goodness of fit of the scale-aware single- or multi-physics model to the measurement of the response for different length scales and/or different time scales.

Clause 18. The method of any of Clauses 11-17, wherein the one or more nondestructive stimuli comprise one or more of: ultrasound waves, acoustic waves, electrical currents, electromagnetic fields, or X-rays.

Clause 19. A system comprising: a processor; a memory coupled to the processor; and instructions provided to the memory, wherein the instructions are executable by the processor to cause the system to perform the method of any of Clauses 11-18.

Clause 20. The system of Clause 19 further comprising: a nondestructive stimuli source; and a detector capable of the measuring of the response of the material to the stimuli.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the incarnations of the present inventions. At the very least, and not as an attempt to limit the application of the doctrine of equivalents to the scope of the claim, each numerical parameter should at least be construed in light of the number of reported significant digits and by applying ordinary rounding techniques.

One or more illustrative incarnations incorporating one or more invention elements are presented herein. Not all features of a physical implementation are described or shown in this application for the sake of clarity. It is understood that in the development of a physical embodiment incorporating one or more elements of the present invention, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for those of ordinary skill in the art and having benefit of this disclosure.

While compositions and methods are described herein in terms of "comprising" various components or steps, the compositions and methods can also "consist essentially of" or "consist of" the various components and steps.

EXAMPLES

Example 1. A series of material samples having heterogeneous properties were exposed to ultrasound waves by stimulating the sample using a transducer at one end. The displacement of the surface of the material was measured in (2+1)D spacetime for the material samples. The resultant data was noisy. The relevant governing equations in this case are those of elastodynamics; namely, conservation of momentum, stress/strain relationship (assuming linear elastic behavior), and momentum/velocity relationship (linear inertial behavior). The conservation law is scale-agnostic (i.e., must hold exactly regardless of the granularity at which integral properties are measured over the material in space and time). The constitutive equations will depend on the choice of length scale and/or time scale, however.

Samples of the composite metal alloys, with and without cracks, and with different grain morphologies, were analyzed with ultrasound waves. The wavefield data, collected by a laser, is then used to detect the presence of cracks. The detection is guided by the observation that the "effective" speed of sound measured over regions of space encompassing the crack is slower than regions of space with no cracks.

In addition, the wavefield data can be used for more advanced material characterization at specified length scales and/or specified time scales. Unlike classical homogenization techniques in which the choice of length scales and/or time scales (e.g., for representative elementary volumes, or unit cells with assumed periodicity) is ad hoc, the method described herein enables choosing the appropriate length scales and/or appropriate time scales at which the integral form of the expected governing equations (i.e., elastodynamics with exact scale-agnostic conservation laws and scale-aware "effective" constitutive laws) holds with a clear separation of signal from noise. For example, the linear homogeneous wave equation in its differential form (i.e., infinitesimal length scales and/or time scales) requires the existence of a correlation between the spatial Laplacian (i.e., divergence of gradient) of the displacement field and the second temporal derivative of the displacement field, noting that the linearity of the constitutive relations makes them commute with the differential operators. The ratio (i.e., constant coefficient of the linear relationship) between the spatial and temporal second-order derivatives is the speed of sound, which is equal everywhere in space and sound due to homogeneity. However, as soon as a small noise is introduced to the displacement field, its first and (more notably) second derivatives are significantly affected and the correlation is no longer detectable. Applying common noise filtering techniques (e.g., band-pass filters) is lossy and will violate first principles such as conservation laws. On the other hand, when the conservation laws are defined at finite length and/or time scales, the correlation emerges much stronger, without applying any ad hoc filtering, based on which a range of different length and/or time scales can be tested.

For general, nonlinear, heterogeneous, anisotropic, and multi-physics coupled governing equations, the relationships are more complicated and cannot be simply described by a ratio between two operators applied to a measure field. However, the method described herein is generalized in a straightforward fashion by using machine learning, in which the conservation laws are built into the structure of the machine learning computation graph (e.g., neural network) and the "effective" conservation laws are parameterized by coefficients that can be learned using various optimization techniques such as back propagation via automatic differentiation.

The goodness of fit (e.g., measured by a loss function) can be used to decide whether the length and/or time scales are selected properly. The selection can be done manually, automatically, or semi-automatically by generating and testing scale-aware integral equations at different scales, evaluating them against the data, and picking the ones that fit best.

Figure 4A:
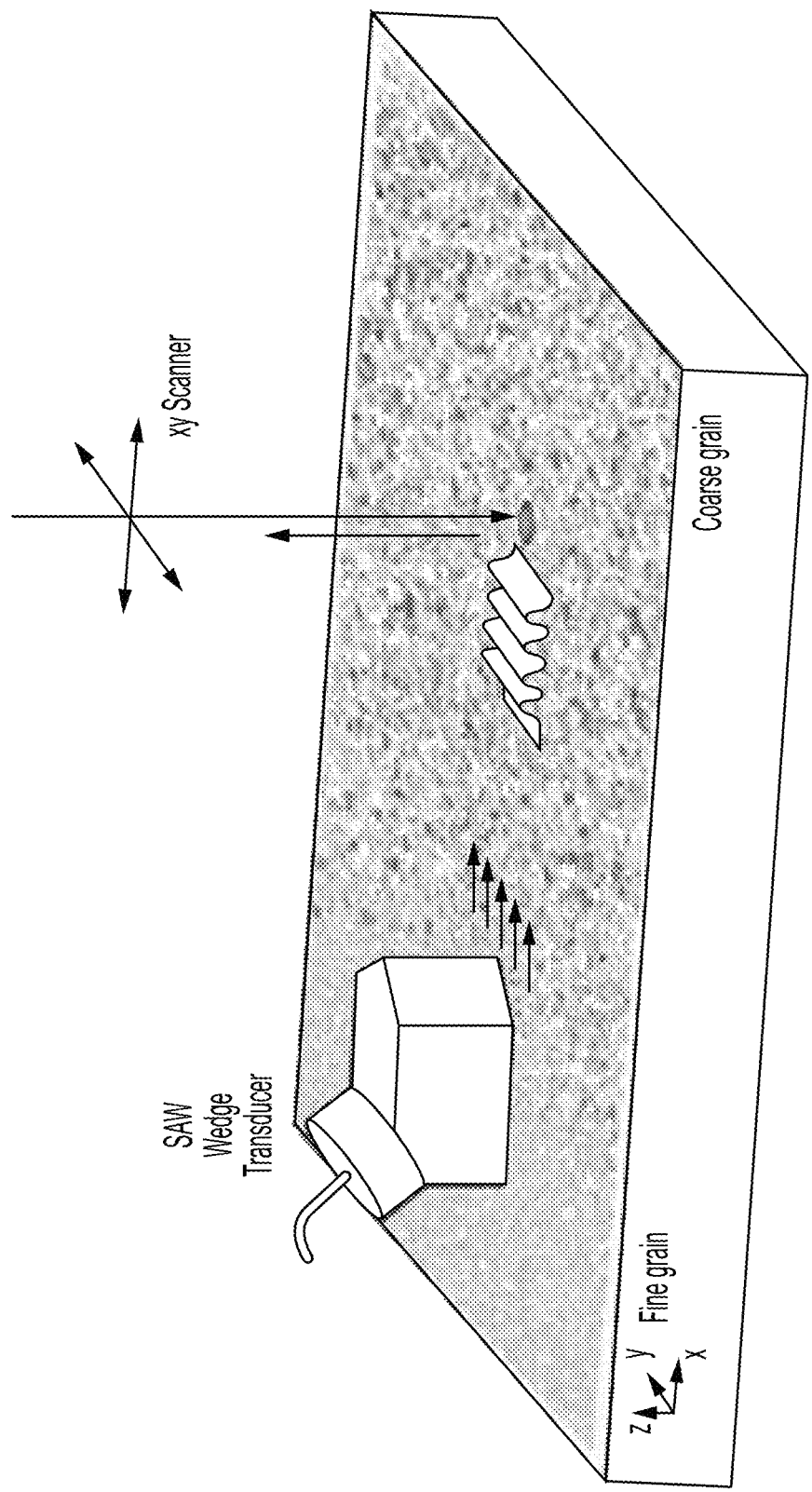
FIG. 4A provides a material sample illustration.

Example 2. FIG. 4A is an illustration of a material sample with different material granularities on its two ends exposed to an ultrasound transducer.

Figure 4B:
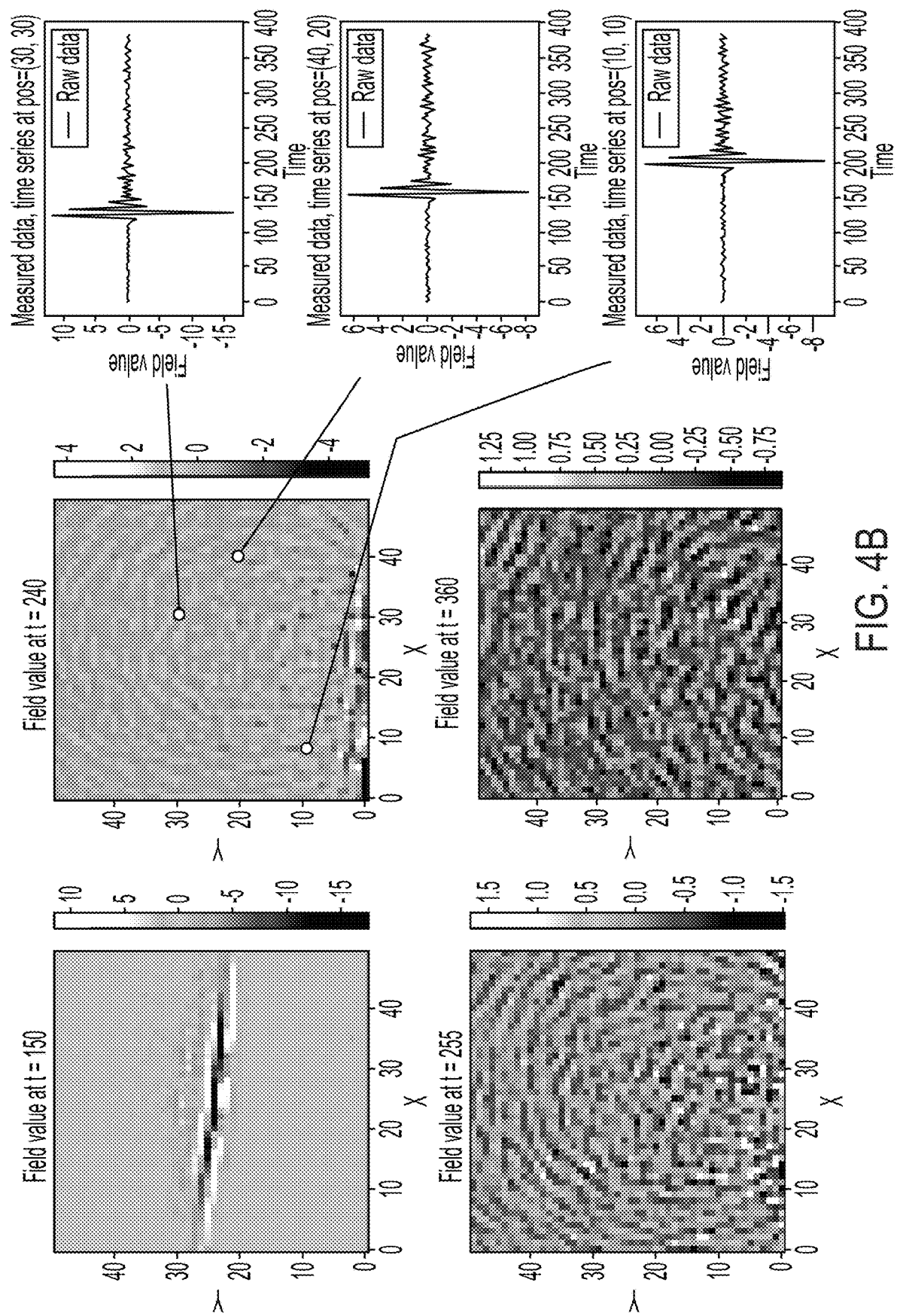
FIG. 4B illustrates plots of the displacement field for two different samples.

FIG. 4B illustrates plots that show the displacement field, measured by the laser (labeled "xy scanner" in FIG. 4A) at different time points, for two different samples on the left and right. At 3 fixed xy locations, the time varying signals are also shown.

Figure 5A:
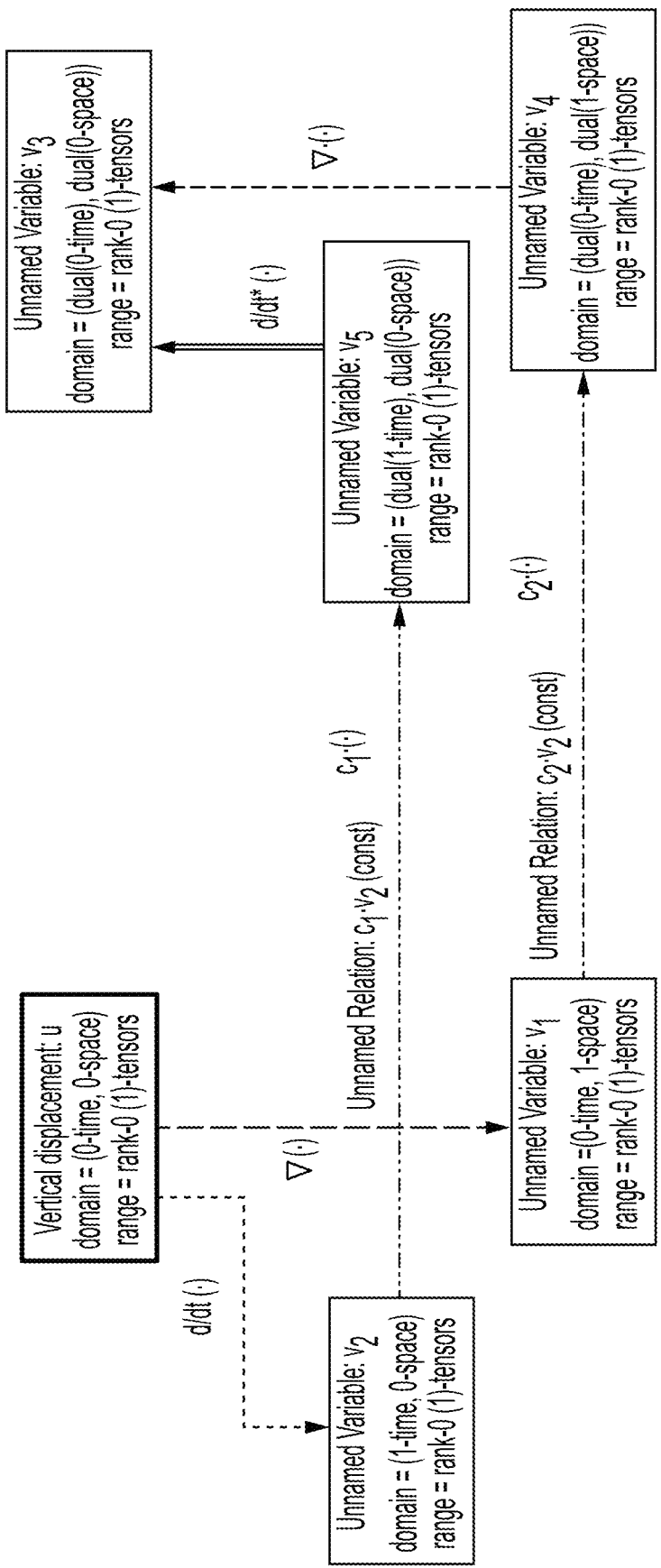
FIGS. 5A-5C illustrate a representation of the simplified governing equations of wave propagation including the different spatial operators ($\nabla(\bullet)$, $c_2\bullet(\bullet)$, $\nabla\bullet(\bullet)$) and the temporal operators ($d/dt\ (\bullet)$, $c_1(\bullet)$, $d/dt^*(\bullet)$) and how said operators correspond to numerical operations on a spatial grid or a temporal grid on which the data is measured (i.e., displacement values are associated with the spatial positions or the temporal instances).
Figure 5B:
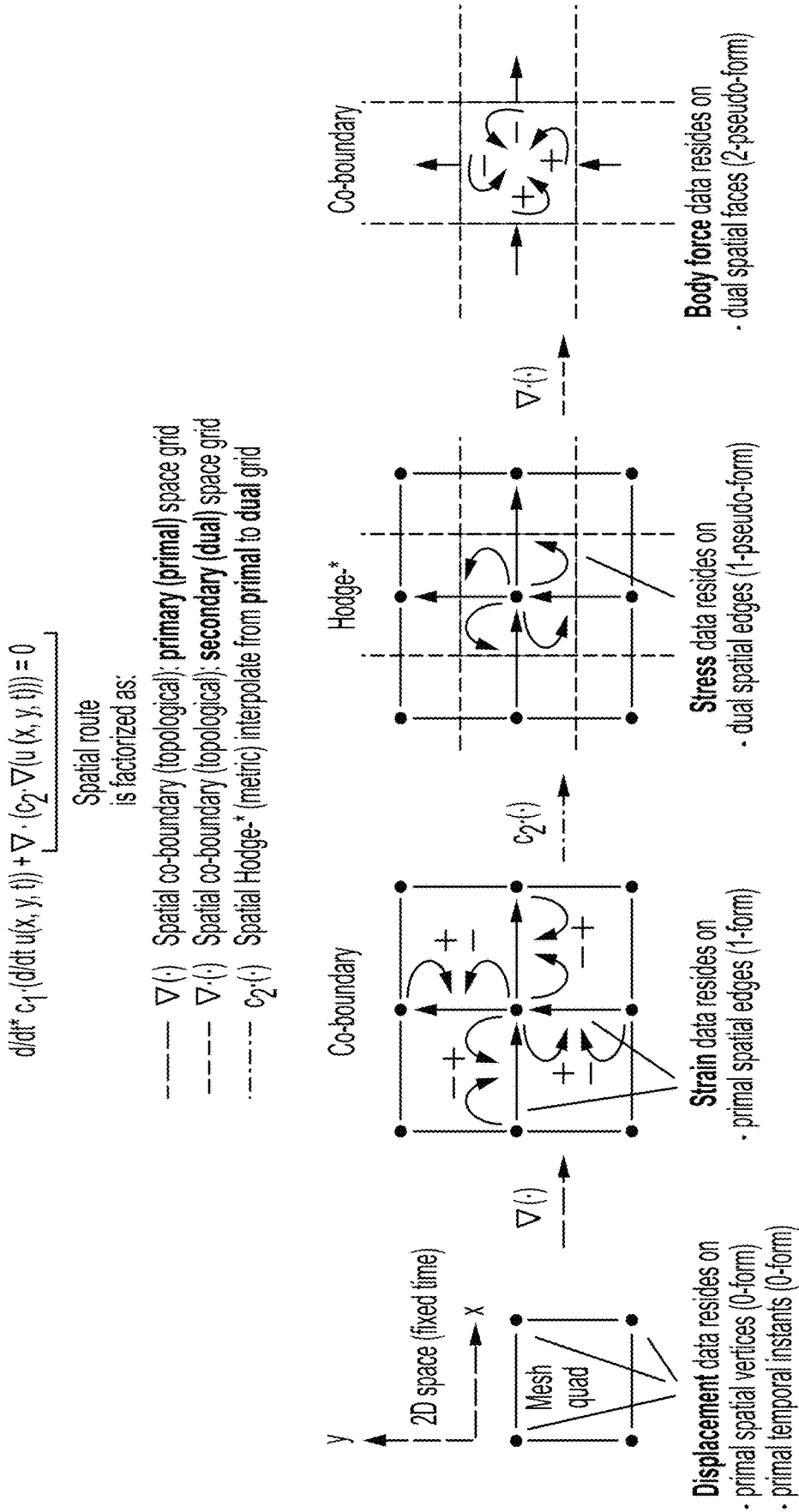
Figure 5C:
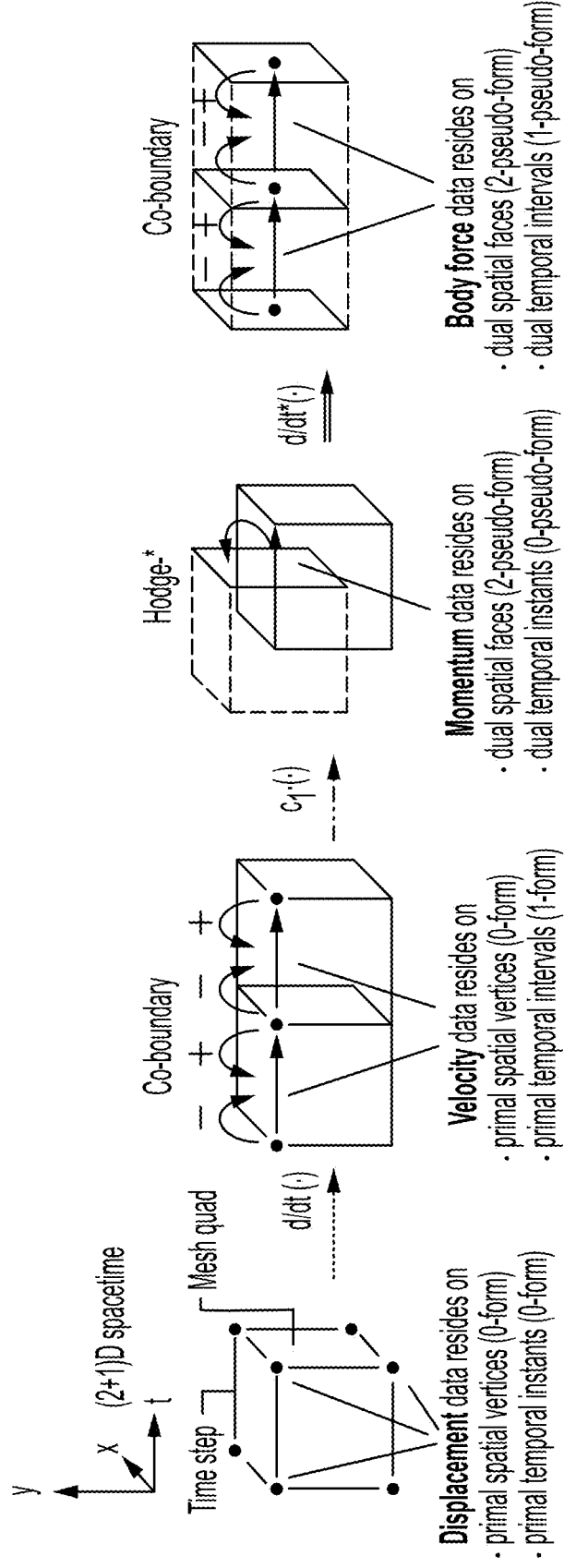

FIGS. 5A-5C illustrate a representation of the simplified governing equations of wave propagation including the different spatial operators ($\nabla(\bullet)$, $c_2 \bullet(\bullet)$, $\nabla \bullet (\bullet)$) and the temporal operators ($d/dt (\bullet)$, $c_1 \bullet (\bullet)$, $d/dt^*(\bullet)$) and how said operators correspond to numerical operations on a spatial grid or a temporal grid on which the data is measured (i.e., displacement values are associated with the spatial positions or the temporal instances). FIGS. 5A-5C show how one would interpret the spatial and temporal operators at the length and time scales at which the measurement is done (i.e., the spatial and temporal grid resolutions). This may not necessarily be the best approach because homogenized material properties may not be meaningful at these scales and the noise will be amplified, as the next set of figures show.

Figure 6A:
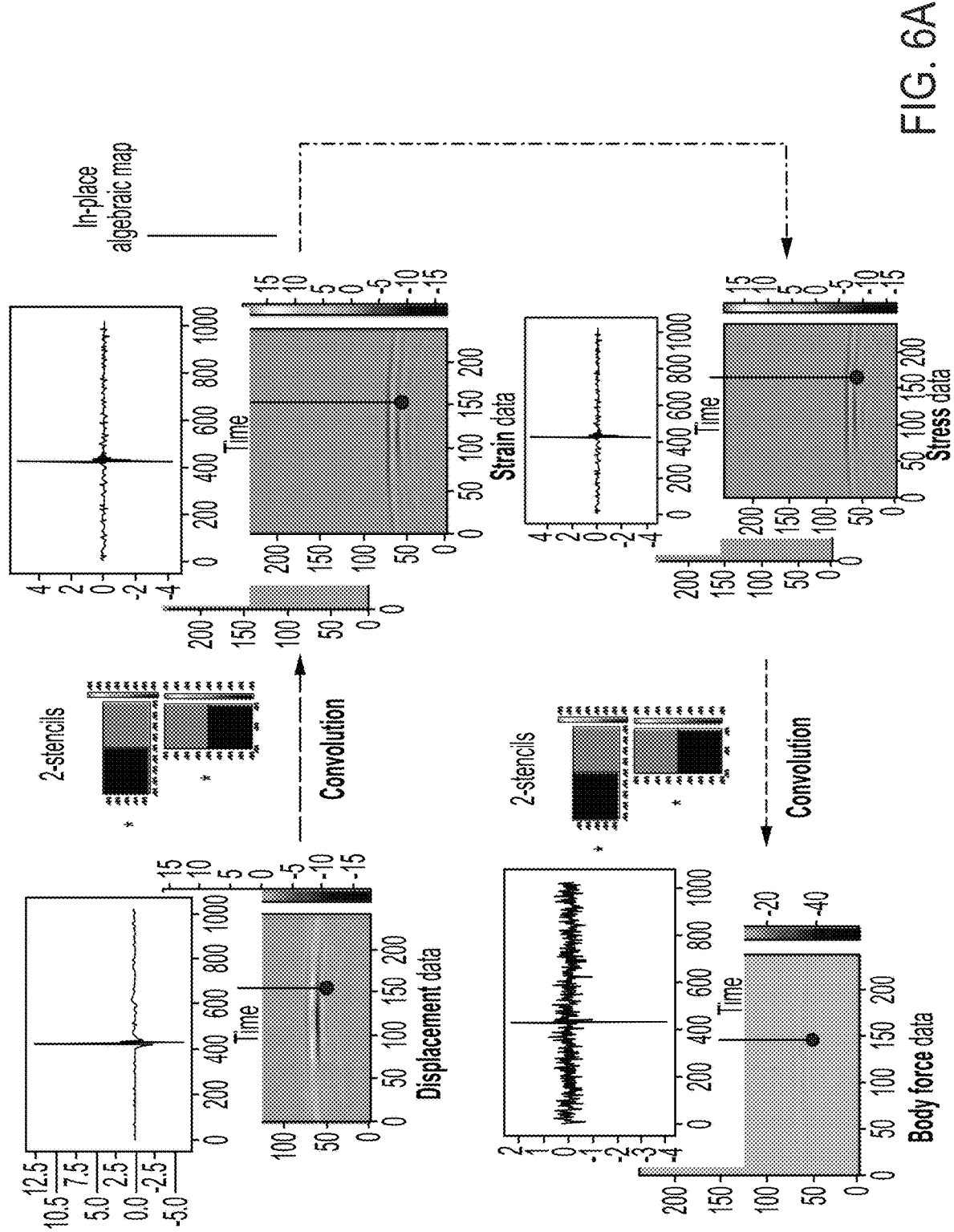
FIGS. 6A-6B and FIGS. 6c-6D illustrate two examples of datasets going through the numerical computations of FIGS. 5A-5C implemented by convolution and in-place algebraic operations, where dash lines of the arrows are consistent with FIGS. 5A-5C.
Figure 6B:
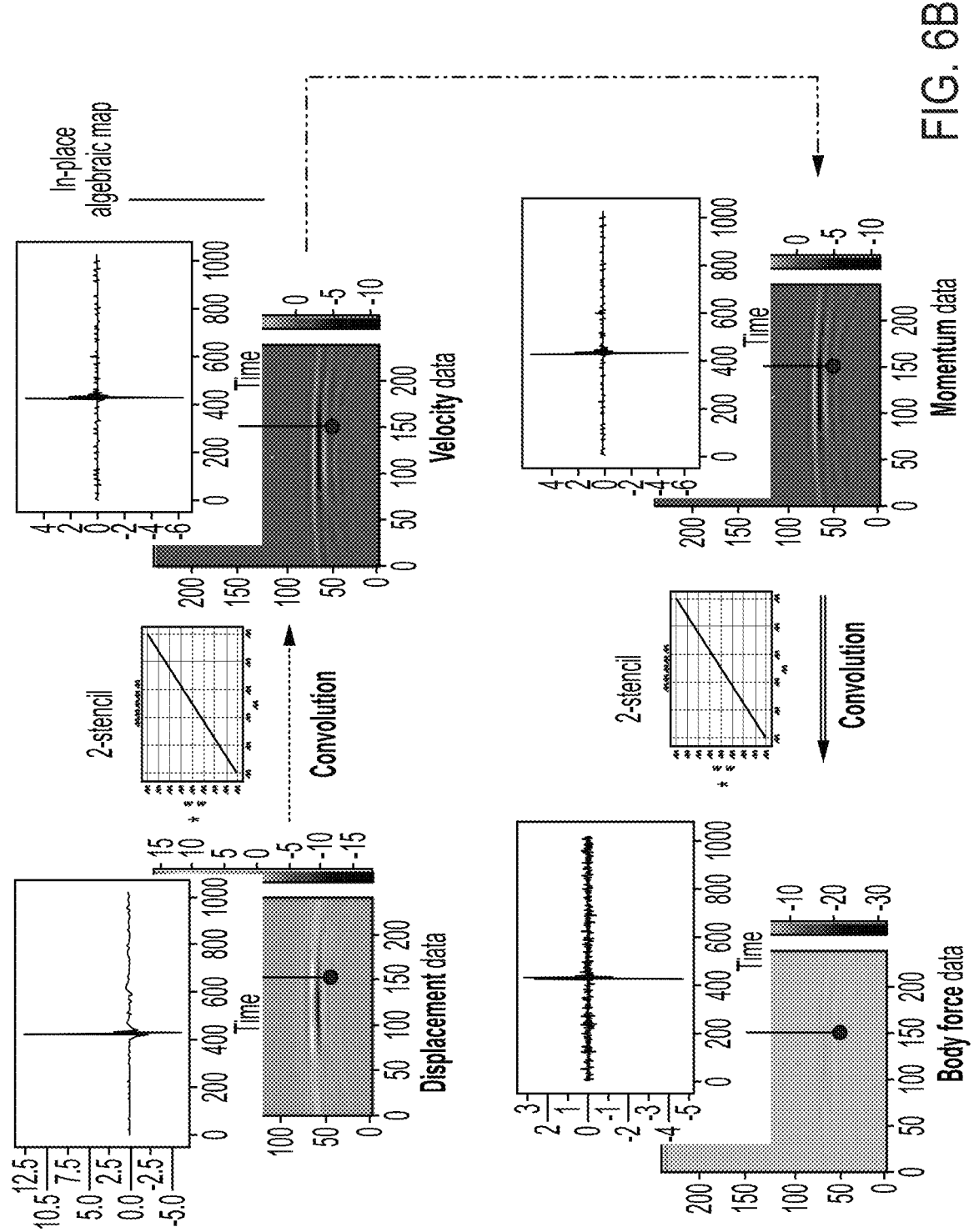

FIGS. 6A-6B shows an example dataset going through the aforementioned numerical computations of FIGS. 5A-5C implemented by convolution and in-place algebraic operations. The dash lines of the arrows are consistent with FIGS. 5A-5C.

Figure 6C:
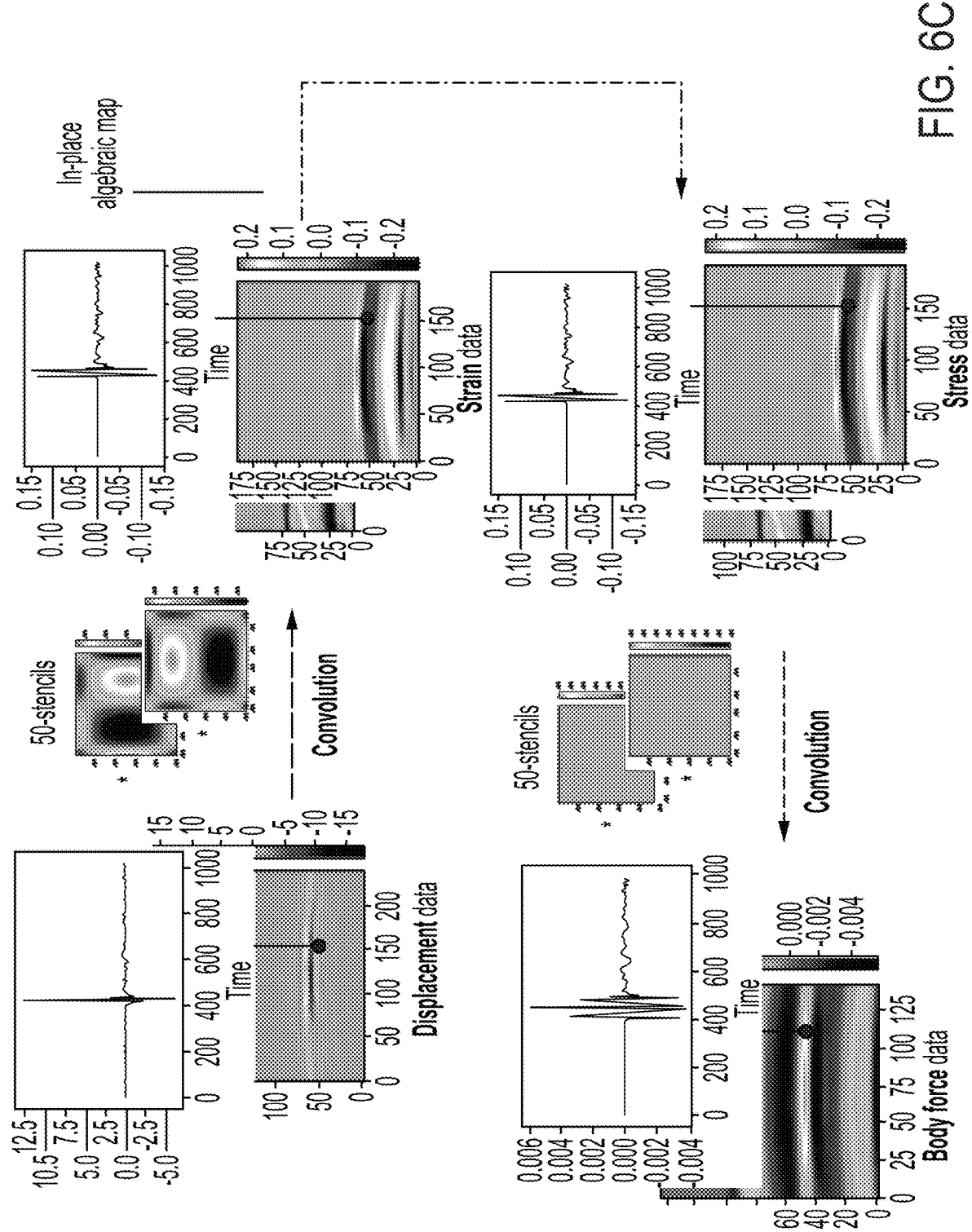
Figure 6D:
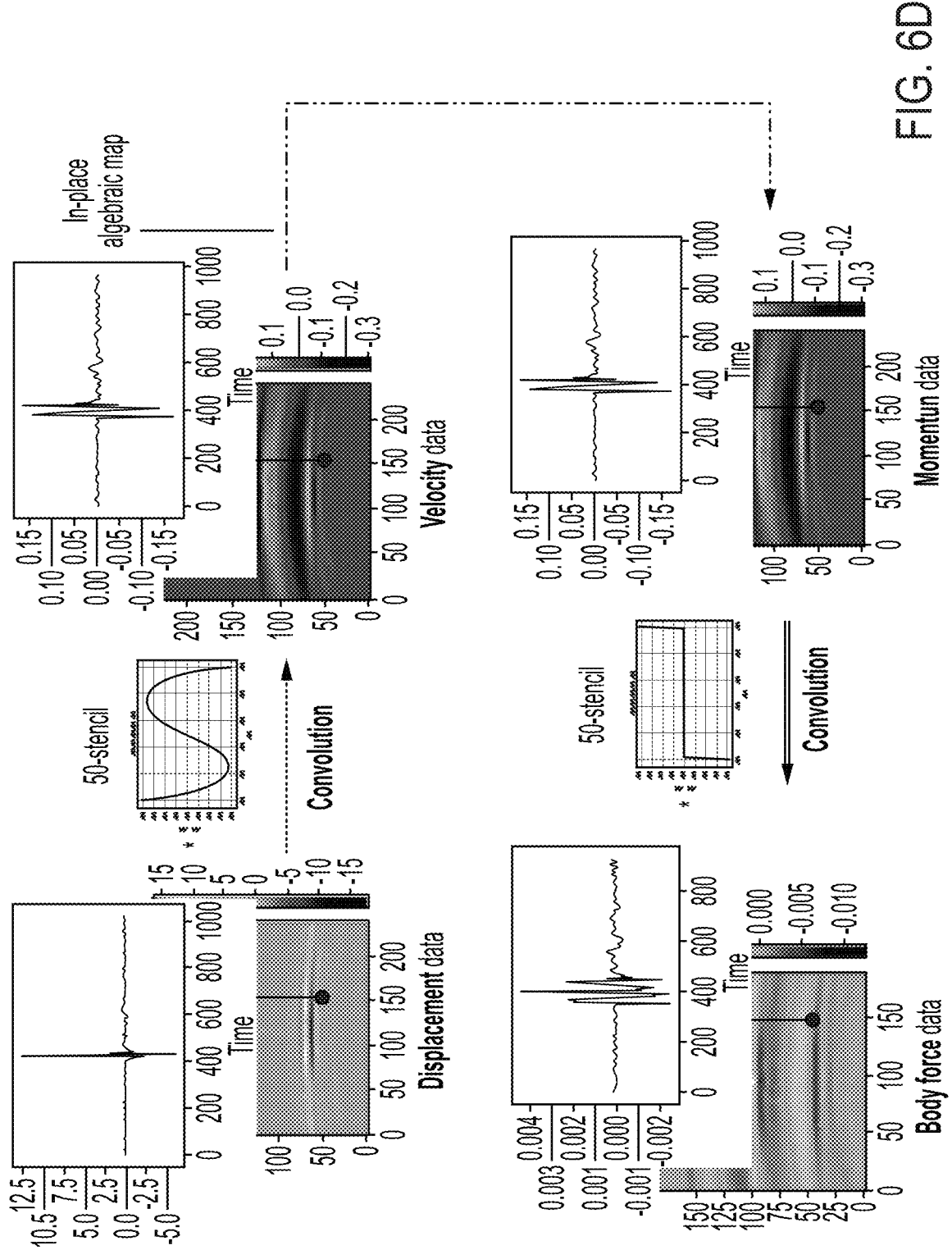
Figure 7A:
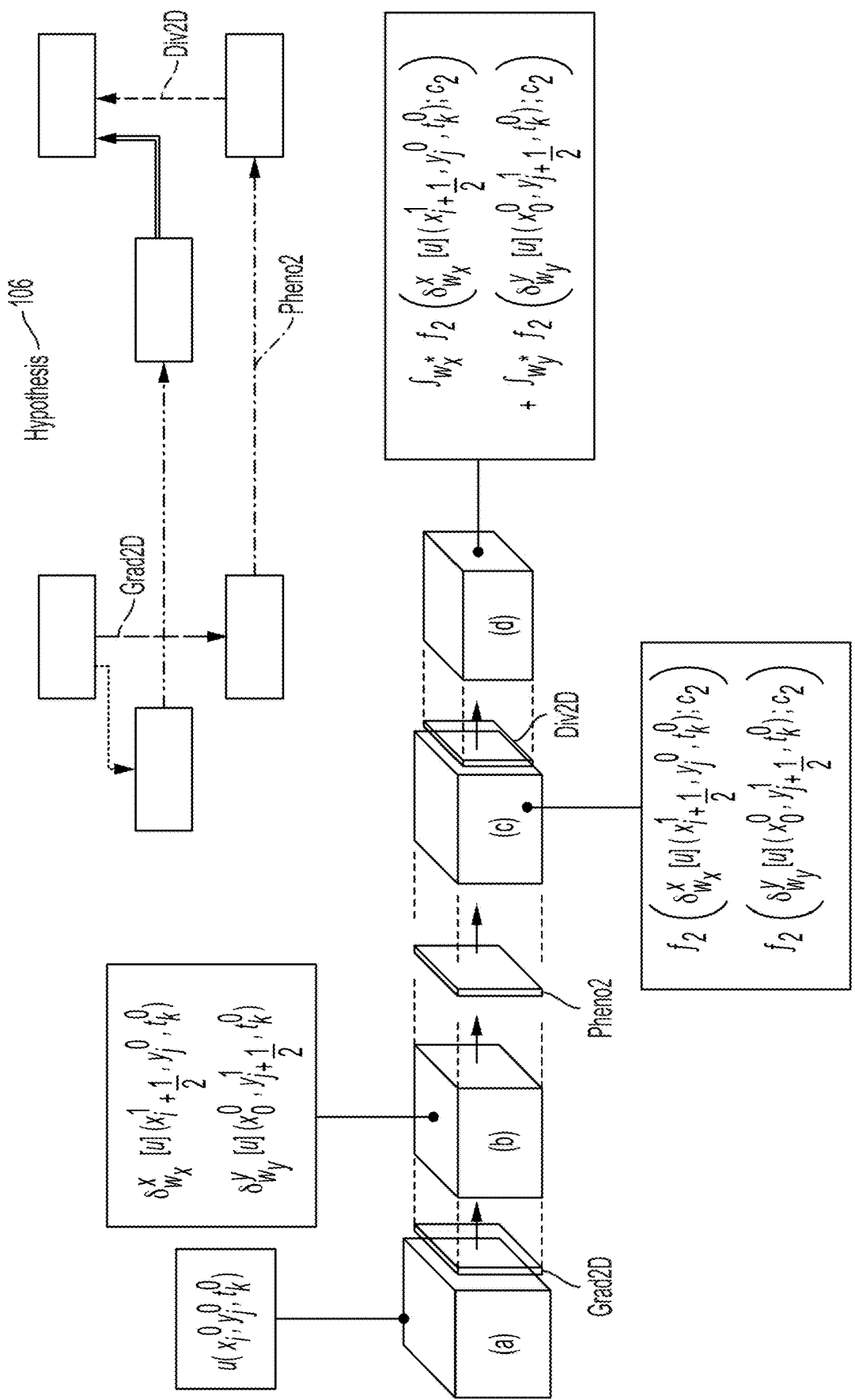
FIGS. 7A-7D show how the computations of FIGS. 5A-5C can be implemented as convolutional layers on a machine learning platform like PyTorch.
Figure 7B:
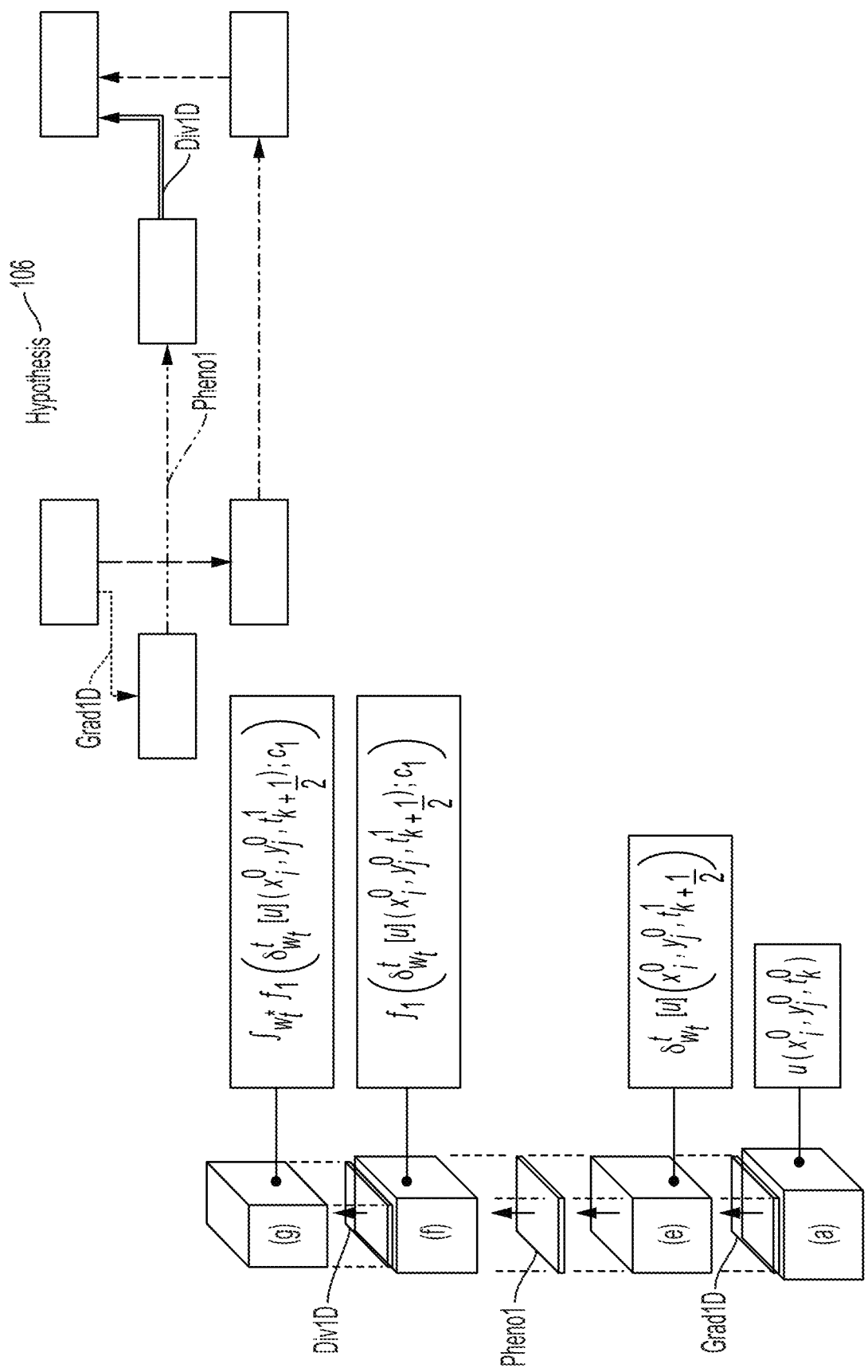
Figure 7C:
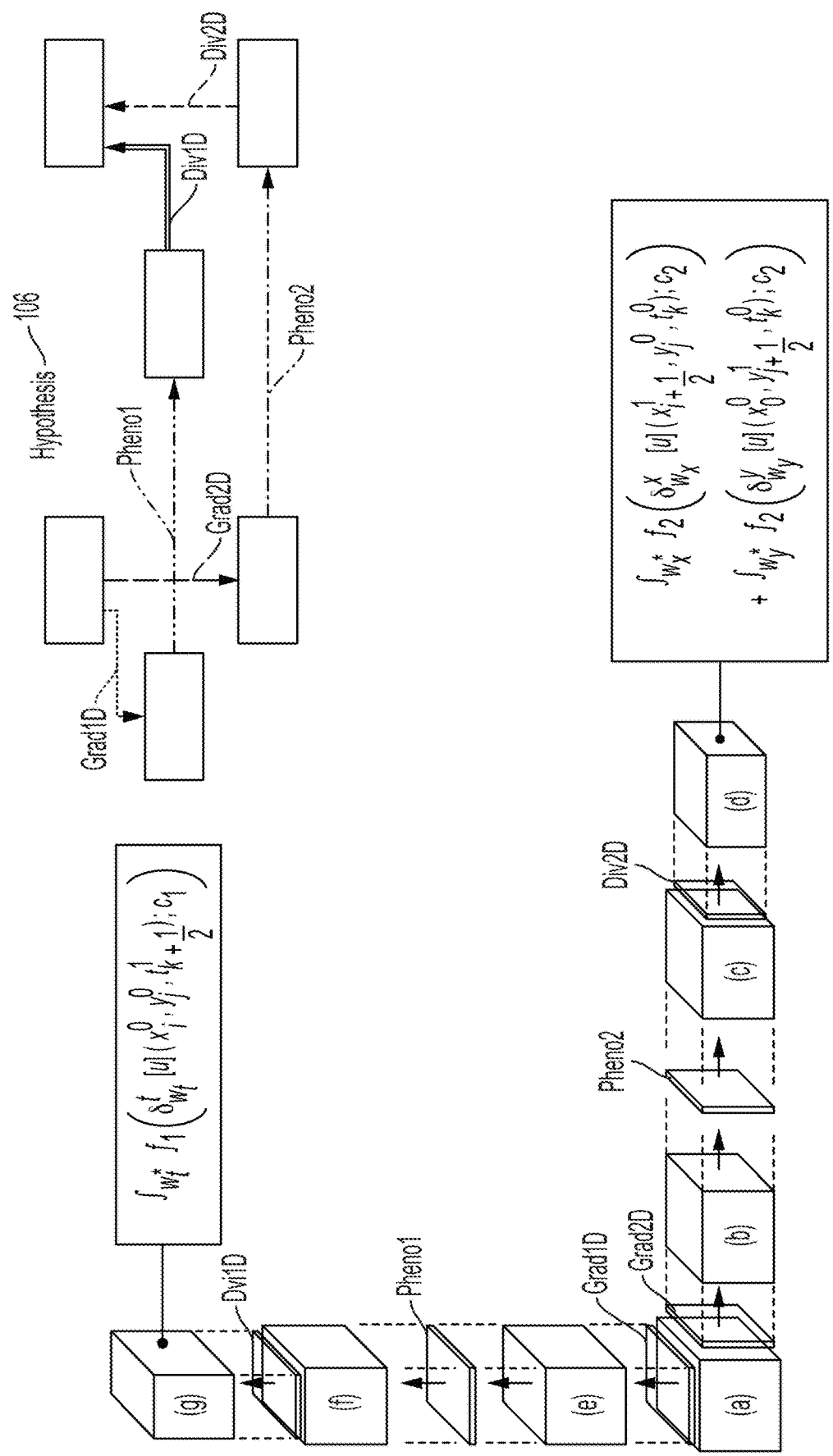
Figure 7D:
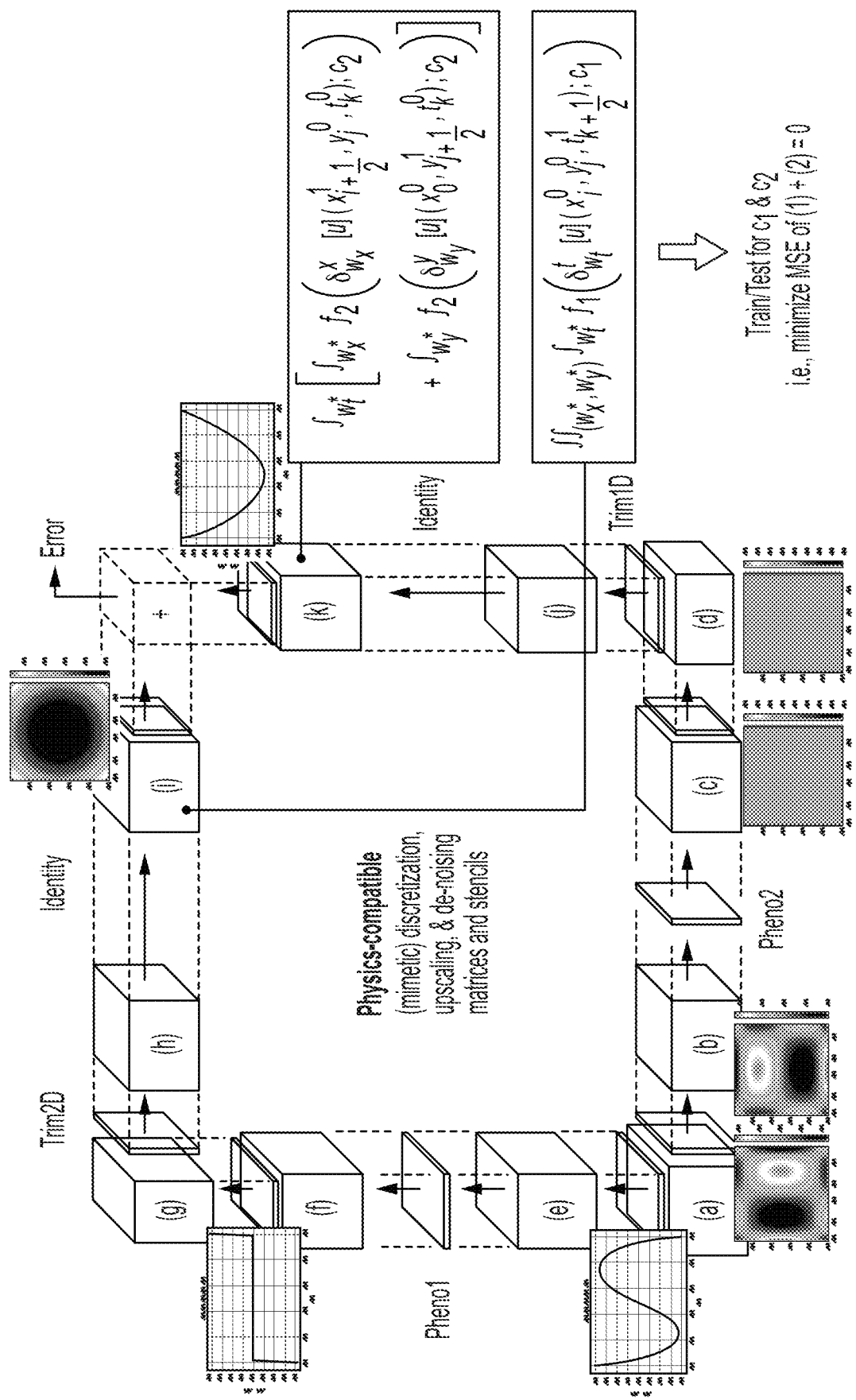

FIGS. 6C-6D is the same as FIGS. 6A-6B except using a scale-aware interpretation of the operators using wider convolution stencils in space and time.

Applying a sequence of operations in space and another sequence of operations in time must yield the same signal, hence, in the case of linear wave equation, the ratio of c1 and c2 coefficients, describing constitutive material properties (in this case, inertia and elasticity, respectively) can be captured as a correlation between the two sequences of computations. The correlation is weak in FIGS. 6A-6B (the output signals do not resemble each other) due to the choice of wrong scale and noise amplification. The correlation is stronger in the scale-aware single- or multi-physics model of FIGS. 7A-7D (the output signals are similar, up to a coefficient c:=c2/c1) due to scale-aware interpretation of operators and the resulting de-noising, while preserving the fundamental physics (e.g., conservation of momentum).

The coefficient c is different at different spatial locations (due to material heterogeneity) but time-invariant. The local effective speed of sound in the material can be computed from this coefficient and used either to detect cracks/damage (the effective speed of sound decreases near the crack due to scattering) or identify statistics of material grain structure.

FIGS. 7A-7D show how the computations of FIGS. 5A-5C can be implemented as convolutional layers on a machine learning platform like PyTorch. Additional layers for trimming and integration (in space and time) are needed to arrive at consistent values when the two paths merge at the top-right corner in FIG. 7D.

Figure 8C:
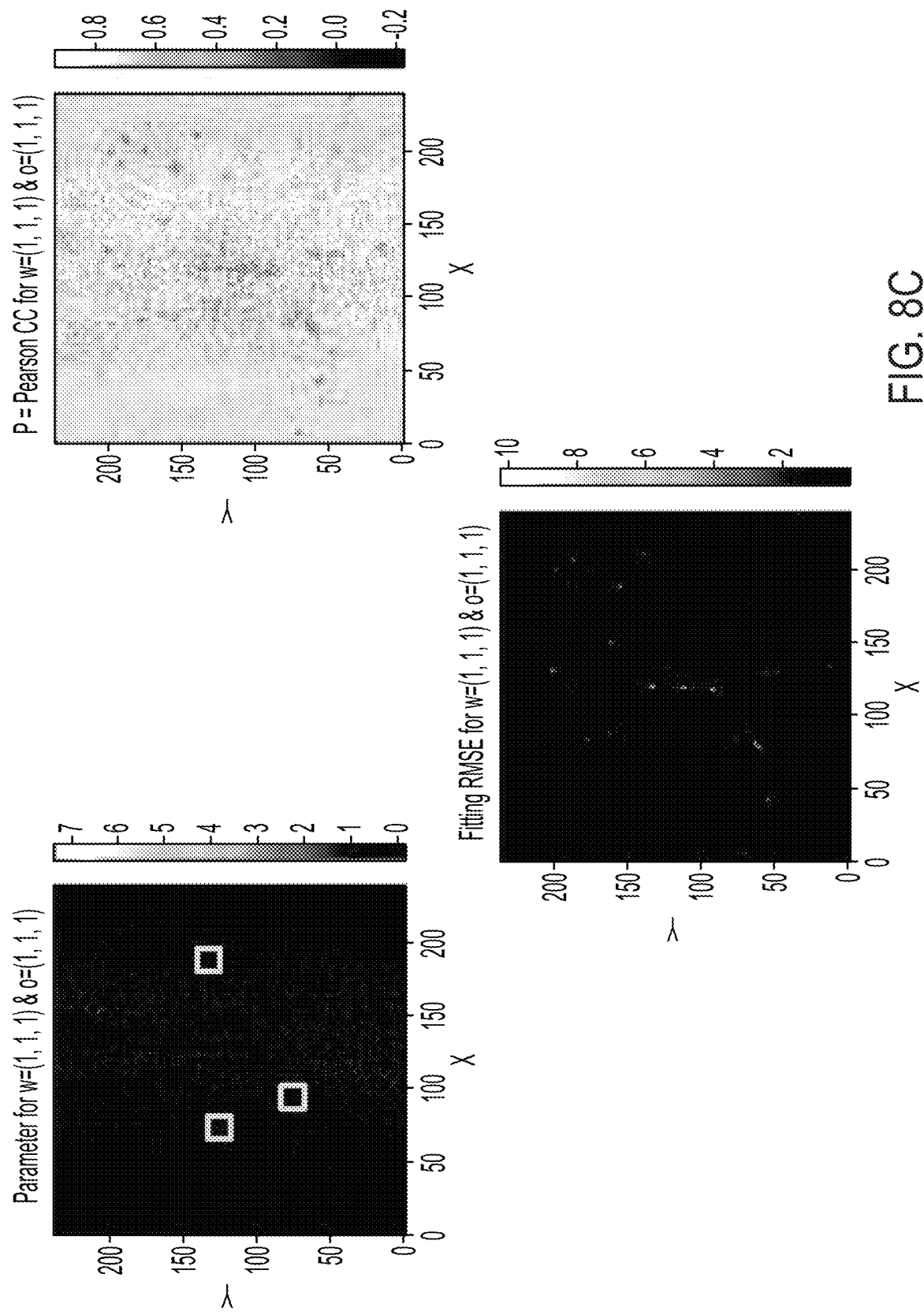

FIGS. 8A-8C illustrates an attempt to fit the coefficient c at different locations on the spatial grid, with the values shown as a field on the bottom-left plot. Three locations are selected by outlined windows (not to scale), over which the computations in FIGS. 6A-6B are performed to obtain the spatial path and temporal path shown in the middle. The correlation between them are shown in the plots above each signal. The correlation for all spatial locations are shown in the larger top-left plot at once.

Figure 9C:
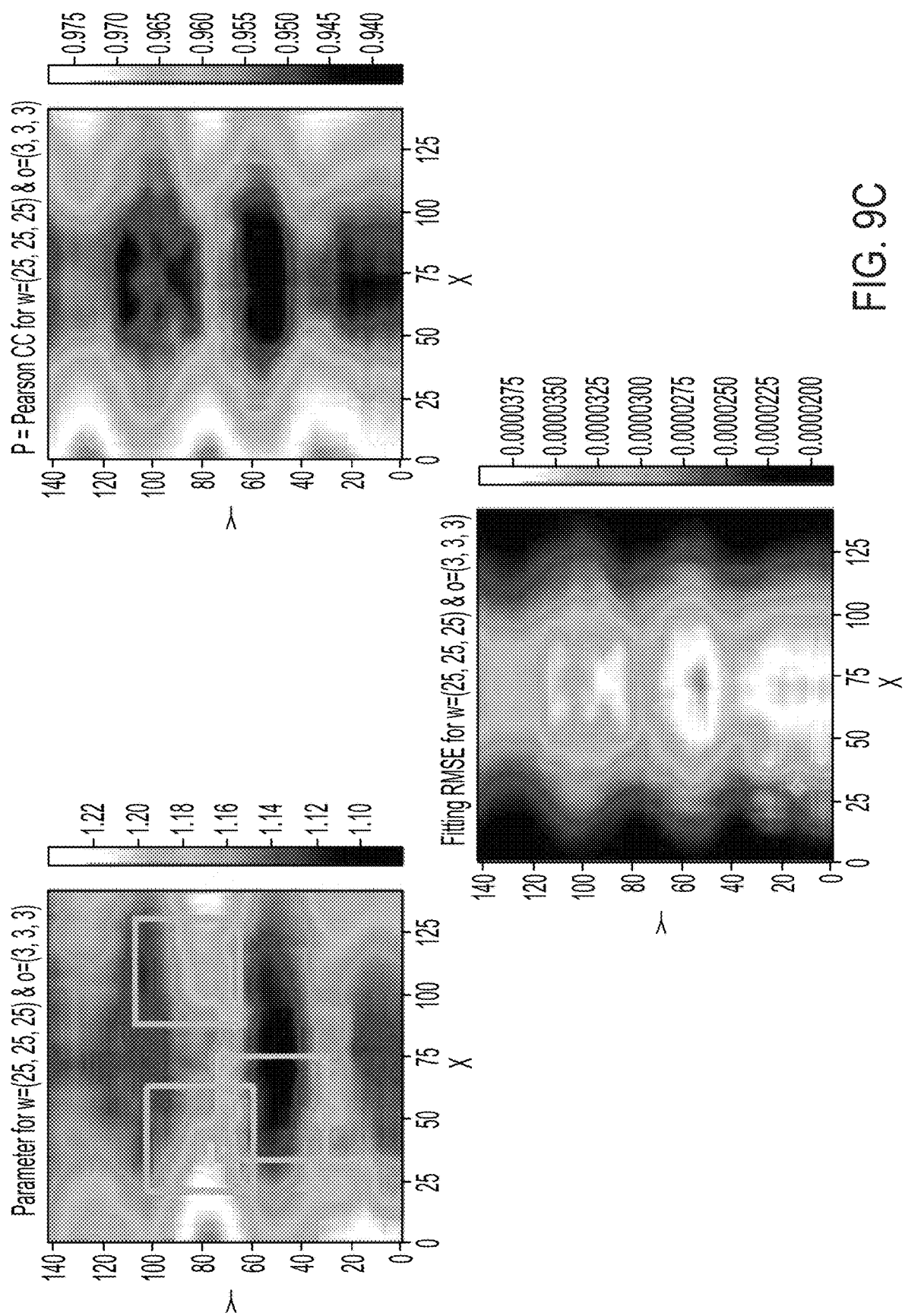

FIGS. 9A-9C illustrates the same as FIGS. 8A-8C except using a larger window size (as shown in the bottom-left plot, not to scale) and using the scale-aware computations in FIGS. 6C-6D. The variation in the coefficient c is better captured in the bottom-left plot, and the blue and red signals are clearly denoised and correlated. The plots of FIGS. 9A-9B resemble a line (unlike the elliptic shape in FIGS. 8A-8B) and the slope of this line is c.

Therefore, the present invention is well adapted to attain the ends and advantages mentioned as well as those that are inherent therein. The particular examples and configurations disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative examples disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

The invention claimed is:

1. A method comprising:
exposing, via a surface acoustic wave (SAW) wedge transducer or an ultrasonic transducer, a material sample having different material granularities to one or more nondestructive stimuli;
measuring, via a laser device, a response of the material sample to the one or more nondestructive stimuli; and
analyzing the measurement of the response with a scale-aware single- or multi-physics model to identify anomalies in the measurement as compared to an expected response of the material sample to the one or more nondestructive stimuli, wherein:
the scale-aware single- or multi-physics model is based on at least one of a specific length scale or a specific time scale; and
the scale-aware single- or multi-physics model comprises governing equations comprising scale-agnostic first principles and scale-aware phenomenological laws that must hold over any finite or infinitesimal regions in a space or a time, and the scale-aware phenomenological laws are single- or multi-physics constitutive or interaction laws that must be learned from data at the at least one of the specific length scale or the specific time scale.

2. The method of claim 1, wherein the constitutive laws are discretized or integrated, and the scale-aware phenomenological laws are parameterized to yield parameters, and wherein optimization is used to fit the parameters to minimize a residual error for the governing equations, a solution error, or an error in observables.

3. The method of claim 1, wherein the constitutive laws are discretized or integrated, and the scale-aware phenomenological laws are parameterized, and wherein machine learning is used to fit the parameters to minimize a residual error for the governing equations, a solution error, or an error in observables.

4. The method of claim 1, wherein the at least one of the specific length scale or the specific time scale are selected manually by a user.

5. The method of claim 1, wherein the at least one of the specific length scale or the specific time scale are selected by a computer based on a goodness of fit of the scale-aware single- or multi-physics model to the measurement of the response for different length scales and/or different time scales.

6. The method of claim 1, wherein the one or more nondestructive stimuli comprise one or more of ultrasound waves or acoustic waves.

7. A system comprising:
a memory coupled to one or more processors, the memory having instructions stored thereon, the instructions executable to cause the one or more processors to perform:
exposing, via a surface acoustic wave (SAW) wedge transducer or an ultrasonic transducer, a material sample having different material granularities to one or more nondestructive stimuli;
measuring, via a laser device, a response of the material sample to the one or more nondestructive stimuli; and
analyzing the measurement of the response with a scale-aware single- or multi-physics model to identify anomalies in the measurements as compared to an expected response of the material sample to the one or more nondestructive stimuli, wherein:
the scale-aware single- or multi-physics model is based on at least one of a specific length scale or a specific time scale; and
the scale-aware single- or multi-physics model comprises governing equations comprising scale-agnostic first principles and scale-aware phenomenological laws that must hold over any finite or infinitesimal regions in a space or a time, and the scale-aware phenomenological laws are single- or multi-physics constitutive or interaction laws that must be learned from data at the at least one of the specific length scale or the specific time scale.

8. The system of claim 7 further comprising:
a nondestructive stimuli source; and
a detector capable of the measuring of the response of the material sample to the one or more nondestructive stimuli.

9. A method comprising:
exposing, via a surface acoustic wave (SAW) wedge transducer or an ultrasonic transducer, a material sample having different material granularities to one or more nondestructive stimuli;
measuring, via a laser device, a response of the material sample to the one or more nondestructive stimuli; and
analyzing the measurement of the response with a scale-aware single- or multi-physics model to characterize one or more effective material properties based on the measurement of the response of the material sample to the one or more nondestructive stimuli, wherein:
the scale-aware single- or multi-physics model is based on the at least one of a specific length scale or a specific time scale; and
the scale-aware single- or multi-physics model comprises governing equations comprising scale-agnostic first principles and scale-aware phenomenological laws that must hold over any finite or infinitesimal regions in a space or a time, and the scale-aware phenomenological laws are single- or multi-physics constitutive or interaction laws that must be learned from data at the at least one of the specific length scale or the specific time scale.

10. The method of claim 9, wherein the constitutive laws are discretized or integrated, and wherein the scale-aware phenomenological laws are parameterized to yield parameters, and wherein optimization is used to fit the parameters to minimize a residual error for the governing equations, a solution error, or an error in observables.

11. The method of claim 9, wherein the constitutive laws are discretized or integrated, and the scale-aware phenomenological laws are parameterized, and wherein machine learning is used to fit the parameters to minimize a residual error for the governing equations, a solution error, or an error in observables.

12. The method of claim 9, wherein the at least one of the specific length scale or the specific time scale are selected manually by a user.

13. The method of claim 9, wherein the at least one of the specific length scale or the specific time scale are selected by a computer based on a goodness of fit of the scale-aware single- or multi-physics model to the measurement of the response for different length scales and/or different time scales.

14. The method of claim 9, wherein the one or more nondestructive stimuli comprise one or more of ultrasound waves or acoustic waves.

15. A system comprising:
 a memory coupled to one or more processors, the memory having instructions stored thereon, the instructions executable to cause the one or more processors to perform:
  exposing, via a surface acoustic wave (SAW) wedge transducer or an ultrasonic transducer, a material sample having different material granularities to one or more nondestructive stimuli;
  measuring, via a laser device, a response of the material sample to the one or more nondestructive stimuli; and
  analyzing the measurement of the response with a scale-aware single- or multi-physics model to characterize one or more effective material properties based on the measurement of the response of the material sample to the one or more nondestructive stimuli, wherein:
   the scale-aware single- or multi-physics model is based on at least one of a specific length scale or a specific time scale; and
   the scale-aware single- or multi-physics model comprises governing equations comprising scale-agnostic first principles and scale-aware phenomenological laws that must hold over any finite or infinitesimal regions in a space or a time, and the scale-aware phenomenological laws are single- or multi-physics constitutive or interaction laws that must be learned from data at the at least one of the specific length scale or the specific time scale.

16. The system of claim 15 further comprising:
a nondestructive stimuli source; and
a detector capable of the measuring of the response of the material sample to the one or more nondestructive stimuli.

* * * * *